United States Patent
Kaminaga et al.

(10) Patent No.: US 6,968,354 B2
(45) Date of Patent: Nov. 22, 2005

(54) TAMPER-RESISTANT MODULAR MULTIPLICATION METHOD

(75) Inventors: Masahiro Kaminaga, Sakado (JP); Takashi Endo, Musashimurayama (JP); Takashi Watanabe, Kokubunji (JP); Masaru Ohki, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 513 days.

(21) Appl. No.: 09/935,654

(22) Filed: Aug. 24, 2001

(65) Prior Publication Data

US 2002/0152252 A1 Oct. 17, 2002

(30) Foreign Application Priority Data

Mar. 5, 2001 (JP) ........................................ 2001-060223

(51) Int. Cl.$^7$ ........................... G06F 7/38; G06F 15/00
(52) U.S. Cl. ..................................... 708/491; 708/492
(58) Field of Search ................................ 708/491, 492, 708/490, 620

(56) References Cited

U.S. PATENT DOCUMENTS

| | | | | | |
|---|---|---|---|---|---|
| 5,764,554 | A | * | 6/1998 | Monier | 708/491 |
| 5,961,578 | A | * | 10/1999 | Nakada | 708/491 |
| 6,026,421 | A | * | 2/2000 | Sabin et al. | 708/491 |
| 6,209,016 | B1 | * | 3/2001 | Hobson et al. | 708/491 |
| 6,298,135 | B1 | * | 10/2001 | Messerges et al. | 708/491 |
| 6,625,631 | B2 | * | 9/2003 | Ruehle | 708/491 |
| 6,748,410 | B1 | * | 6/2004 | Gressel et al. | 708/491 |

FOREIGN PATENT DOCUMENTS

| | | |
|---|---|---|
| EP | 0 801 345 A1 | 4/1997 |
| EP | 1 006 492 A1 | 11/1999 |
| EP | 1 134 653 A2 | 3/2001 |

OTHER PUBLICATIONS

Paul C. Kocher, Timing Attacks on Implementations of Diffie–Hellman, RSA, DSS and Other Systems, Advances in Cryptology—Crypto 96, 16$^{th}$ Annual International Cryptology Conference, Aug. 18–22, 1996, vol. Conf. 16, pp. 104–113.

Thomas S. Messerges, Ezzy A. Dabbish, Robert H. Sloan, "Power Analysis Attacks of Modular Exponentiation on Smartcards", Cryptographic Hardware and Embedded Systems, International workshop Aug. 1999, pp 144–157.

Ross Anderson and Markus Kuhn, "Tamper Resistance—A Cautionary Note", The Second USENIX Workship on Electronic Commerce Proceedings, Oakland, California, Nov. 18–21, 1996, pp. 1–11.

Marc Joye, Arjen K. Lenstra and Jean–Jacques Quisquater, "Chinese Remaindering Based Cryptosystems in the Presence of Faults", to appear in Journal of Cryptology, pp. 1–5.

Peter Montgomery, "Modular Multiplication Without Trial Division", Mathematics of Computation, vol. 44, No. 170, Apr. 1985, pp. 519–521.

\* cited by examiner

*Primary Examiner*—Kakali Chaki
*Assistant Examiner*—Chat Do
(74) *Attorney, Agent, or Firm*—Reed Smith LLP; Stanley P. Fisher, Esq.; Juan Carlos A. Marquez, Esq.

(57) ABSTRACT

The disclosed technology of the present invention relates to an information processing device such as an IC card, and specifically to the overflow processing which occurs in a modular multiplication operation during crypto-processing. Such overflow processing exhibits a particular pattern of consumption current. It is the subject of the present invention to decrease the relationship between the data processing and the pattern of the consumption current. In the processing procedures for performing a modular exponentiation operation according to the 2 bit addition chain method, the modular multiplication operation to be executed is selected at random, the selected modular multiplication operation is executed for each 2 bits, the correction of the result is performed, and the result of the calculation (i.e, a corrected value or uncorrected value) is outputted.

13 Claims, 17 Drawing Sheets

TO FIG. 14 ※

TAMPER-RESISTANT MODULAR MULTIPLICATION METHOD

BACKGROUND OF THE INVENTION

The present invention relates to a tamper-resistant crypto-processing method for high security media such as IC cards.

An IC card is a device which keeps personal information which is not allowed to tamper or performs encryption of data or decryption of a ciphertext with the use of secret keys. An IC card itself does not have its own power supply, and when it is inserted into a reader/writer for an IC card, power is supplied to the IC card and it is made operable. After it is made operable, the IC card receives commands transmitted from the reader/writer, and following the commands the IC card processes, for example, transfer of data. A general explanation of IC card is given in Junichi Mizusawa, "IC card", Ohm-sha, denshi-tsuushin-jouhou-gakkai-hen, etc.

An IC card is constituted such that a chip 102 for an IC card is mounted on a card 101 as shown in FIG. 1. In general, an IC card comprises a power supply terminal VCC, a grounding terminal GND, a reset terminal RST, an input/output terminal I/O, and a clock pulse terminal CLK at the positions determined by the ISO7816 standards, and through these terminals an IC card is supplied power from a reader/writer or communicates with it (Refer to W. Rankl and Effing: Smartcard Handbook, John Wiley & AMP; SONS, 1997, PP. 41).

The configuration of a chip for an IC card is basically the same as that of a typical microcomputer. The configuration is, as shown in FIG. 2, composed of a central processing unit(CPU) 201, a memory device 204, an input/output (I/O) port 207, and a coprocessor 202 (in some case, there is no coprocessor). The CPU 201 is a device which performs logical operation, arithmetical operation, etc. The memory device 204 is a device which stores programs, data, etc. The input/output port is a device which communicates with the reader/writer. The coprocessor is a device which performs crypto-processing itself or performs operation necessary for crypto-processing with a high speed. There is, for example, a special calculator for performing residue operation of RSA cryptogram or a cipher device which performs round processing of DES-cryptogram. Some of the processors for IC cards comprise no coprocessor. A data bus 203 is a bus which connect respective devices to each other.

The memory device 204 is composed of ROM (read only memory), RAM (random access memory), EEPROM (electrical erasable programmable read only memory), etc. ROM is a memory which is not changeable and it is mainly used for storing programs. RAM is a memory which can be freely rewritable but when the power supply thereof is off, the stored contents of the RAM are erased. When an IC card is drawn out of a reader/writer, since the power supply is made off, the contents of the RAM disappear. EEPROM is a memory which holds the contents even when the power supply is stopped. EEPROM is used to store the data which are to be held thereon even when it is disconnected from the reader/writer in a case where rewriting is needed. For example, the number of prepaid times of a prepaid-card is rewritten every time it is used, and the data should be held even when it is taken off from the reader/writer. Therefore such data must be held on an EEPROM.

An IC card has programs and/or other important information enclosed in the chip, and is used to store important information or to perform crypto-processing therein. Conventionally, the difficulties to decrypt a ciphertext in an IC card have been considered to be equivalent to those to decrypt a cipher-algorithm. However, the consumption current, when it is performing crypto-processing, is closely observed and analyzed it; thereby it is suggested that contents of a crypto-processing or secret keys may be estimated easier than the decryption of a crypto-algorithm. The consumption current can be observed by the measurement of the current being supplied from the reader/writer. The detail of this threatening attack method is described in 8.5.1 Passive Protective Mechanisms (p. 263) of John Wiley & AMP; SONS, W. Rankl & AMP; W. Effing "Smart Card Handbook".

CMOS which constitutes a chip for an IC card consumes current when its output conditions turns from 1 to 0 or from 0 to 1. In particular, in the data bus 203, because of the current of a bus driver, and the static capacity of wirings and the transistors connected to the wirings, when the value of the bus changes from 1 to 0 or from 0 to 1, a large current flows. Therefore, if the consumed current is observed, there is a possibility that one may be able to estimate what is being operated inside.

FIG. 3 shows the waveform of a consumed current by an IC card chip in a cycle. Depending on the kind of data processing, the waveform differs as shown in curves 301 and 302. The difference like this occurs depending on the kind of data flowing in the bus 203 or being processed in the CPU 201.

The coprocessor 202, in parallel to the CPU, for example, it is able to perform modular arithmetic operation of 512 bits, so that it is possible to observe a consumption current of a different waveform from that of the CPU over a long time. By the observation of the distinctive pattern, the number of times of operations of a coprocessor can be easily estimated. If there is any relation between secret keys and the operation times of the coprocessor, there is a possibility that one can estimate the secret keys from the operation times of the coprocessor.

If there is a deviation depending on the secret keys in the contents of operation of the coprocessor, the deviation is obtained from the consumption current, and the secret keys can be estimated. For example, in an overflow processing which occurs in the case of modular multiplication operation, in many cases, a consumption current particular to an overflow is generated. In another case, processing time sometimes differs depending on an overflow process is executed or not.

In the case of CPU, similar circumstances exist. Since the number of bits of a secret key is known, if the consumption current is observed by changing data to be processed, the influence of the bit value of the secret key might be able to be observed. When the waveforms of consumption currents are statistically processed, one might be able to estimate the secret key.

SUMMARY OF THE INVENTION

The subject of the invention is to decrease the relationship between the data processing in an IC card chip and the consumption current. If the relationship between the consumption current and the processing in a chip is decreased, it becomes difficult to estimate the processing in an IC card chip or the secret key from the observed consumption current. A focus of attention of the present invention is that in the modular multiplication process in an IC card chip, AB MOD N, or the modular multiplication process by Montgomery's method, ABR^(−1) MOD N (in this place AB expresses Bth power of A), multiplier B or multiplicand A is substituted with TN+B*(−1)^G, SN+A*(−1)^F (S, T, F, G are integers, where F and G are 0 or 1 each) with the use of their modulus N, and after that if they are processed, it becomes difficult to estimate the contents of a process or the secret key from the waveform of the consumption current or the deviation of the processing time.

A tamper-resistant apparatus represented by an IC card chip comprises a storage composed of a program storage unit for storing programs and a data storage unit for storing data, and a central processing unit (CPU) which executes the predetermined processes following the programs. The apparatus can be understood as an information processing device in which the programs, composed of processing instructions to be given to the CPU, provide one or more data processing means.

In the case of a high security IC card represented by electronic money, RSA cryptosystem or elliptic curve cryptosystem on Galois field GF(P^N):(P is a prime, N is a positive integer) is used. In that case, the processing of the modular multiplication operation, A*B MOD N, or the modular multiplication operation of a polynomial, A(X)*B(X) MOD Φ(X) becomes necessary (in some case, A=B). Since the concept does not differ in the case of polynomials, explanation will be given on the ordinary modular multiplication process in the following. The modular multiplication processing of polynomials differs a little in computer implementation the ordinary modular multiplication processing, but it will be explained in detail in the preferred embodiment according to the present invention.

In the present invention, one of the methods to disturb the relationship between the data processed by the modular multiplication operation and the consumption current of an IC card chip is, instead of directly using the real data used for arithmetic processing, to perform the calculation with data by which a calculation result is not largely changed and to correct the result after the calculation.

To be more specific, when the modular multiplication processing, A*B MOD N is calculated, the multiplier B and the multiplicand A are substituted with TN+B*(−1)^G and SN+A*(−1)^F respectively (S, T, F, G: at least one of them is nonzero integer, where F and G are 0 or 1 each) and S=(SN+A*(−1)^F)*(TN+B*(−1)^G) MOD N is calculated, and after that in a case where (F+G) is an odd number, (N−S) shall be made the result of a modular multiplication operation, or in a case where (F+G) is an even number, S may be made the result of the calculation.

In the above process, every time when the modular multiplication operation is performed, the result is corrected to the real solution. In the case of the modular exponentiation operation represented by RSA cryptosystem, there is no need to give correction every time, correction may be given once in the last time.

In the modular multiplication process used for the modular exponentiation Y^X MOD N to be used in RSA cryptosystem, when the modular multiplication process A*B MOD N is calculated, both multiplier B and multiplicand A are substituted with TN+B*(−1)^G and SN+A*(−1)^F respectively, (S, T, F, G are integers, where F or G are 0 or 1 each), then S is calculated as follows:

$$S=(SN+A*(-1)^F)*(TN+B*(-1)^G) \text{ MOD } N,$$

and at last time, if necessary, a correction of subtracting the calculated value of the modular exponentiation operation from N may be made. The reason why we can do such calculation as described above will be explained in the preferred embodiment according to the present invention to be described later.

Because of the process as described above, a current with a different pattern from that of the original current to be generated in the modular multiplication process is to be observed, so that it becomes difficult to estimate the internal processes based on the waveform expected in a case where the original data are used. When S, T, F, G are changed with an information source which are not able to be estimated from outside, the effect will be enhanced. In particular, when a statistic process as to take the average of various kinds of waveforms is executed, it will erase the characteristic features of the waveforms in the same way as to average random waveforms, and the effect will be further enhanced.

The present invention can be utilized in the information hiding such as a modular multiplication operation or modular exponentiation calculation in RSA cryptosystem, and multiplication/division on the field of definition or scalar multiple of a base point in the elliptic curve cryptosystem.

DESCRIPTION OF THE PREFERRED EMBODIMENTS

Figure 1:
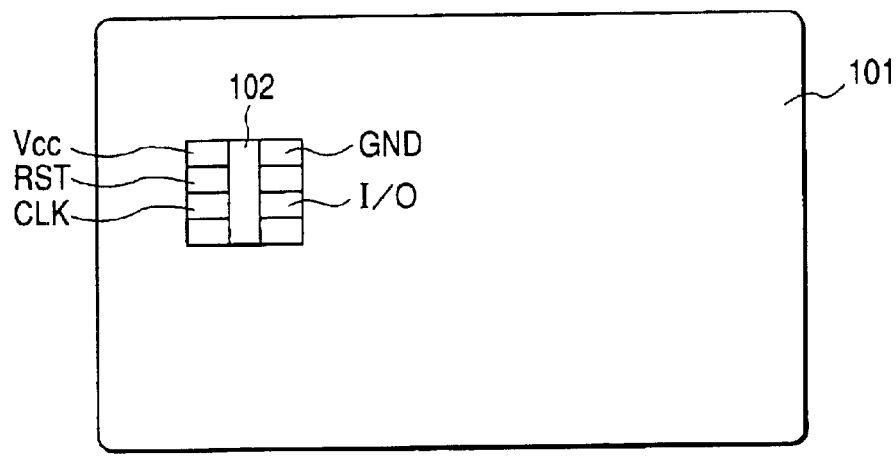
FIG. 1 is an external view of an IC card and the configuration of terminals.
Figure 2:
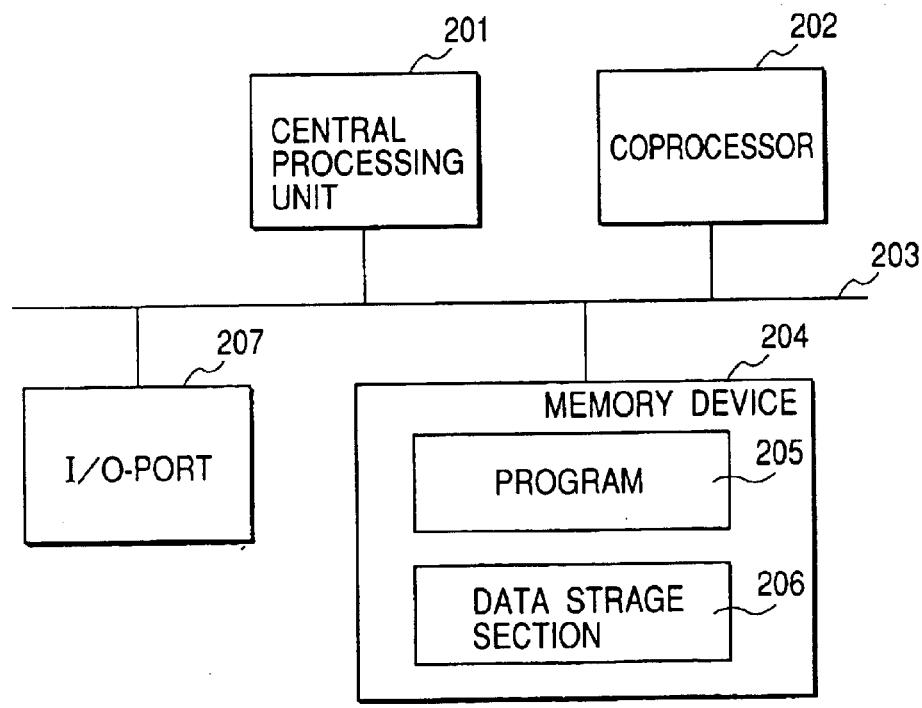
FIG. 2 is a block diagram of a microcomputer.
Figure 3:
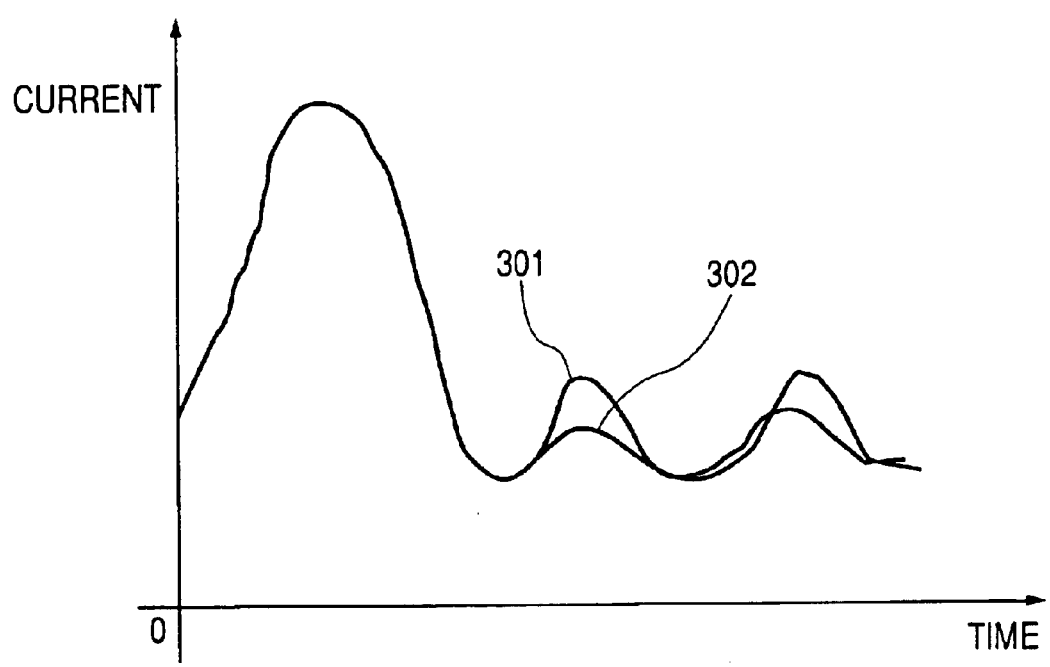
FIG. 3 is a view showing examples of waveforms of consumption currents.

In embodiments shown below, RSA cryptosystem representative of the public key cryptosystem (asymmetric key cryptosystem) and the elliptic curve cryptosystem are used for examples. On RSA cryptosystem, detailed explanation is given in Eiji Okamoto "Angouriron Nyuumon", (Kyoritsu-Shuppan), and A. J. Menezes, P. C. Van Oorschot, S. A. Vanstone "Handbook of Applied Cryptography", (CRC-Press). On the elliptic curve cryptosystem, Neal Koblitz, "A Course in Number Theory and Cryptography", Graduate Texts in Mathematics 114, Springer-Verlag, 1994; on the arithmetic operation on an elliptic curve, Joseph H. Silverman and John Tate, "Rational Points on Elliptic Curve", Springler-Verlag, 1992; and on the algebraic system such as "group", "ring", "field", etc. in Kazuo Matsuzaka, "Daisuukei-Nyuumon", Iwanami Shoten, there are detailed explanations, respectively.

Before the explanation of embodiments, mathematical knowledge will be put in order to be the background of the explanation. In general, in the public key cryptosystem (asymmetric key cryptosystem), secret key information is included in the public key, and cryptograms are constituted on the basis that, in spite of this fact, to take out secret key information from a public key is almost unrealistic on account of a lot of time necessary for calculation (Safeness based on large calculation time). As representative problems having safeness on calculation time, a prime factor dissolution and a discrete logarithm problem on a group can be cited. What utilizes the former is RSA cryptosystem, and what applies the latter to Mordell-Weil group on an elliptic curve for utilization is an elliptic curve cryptosystem.

RSA cryptosystem will be briefly explained. In the RSA cryptosystem, a product N of 2 large primes P and Q, for example 512 bits each, N=PQ, and a number E (In many IC cards, 3 or 65537 is used) which is mutually prime with N are adopted. Those numbers N and E are registered on a file of public key as a public key. In this situation, a transmitter B transmits data (a plaintext) L expressed by a number of larger than 1 and smaller than N−1 in an encrypted form, $$Y = L\hat{}E \text{ MOD } N$$

to the possessor A of the public key, where L^E is an expression showing Eth power of L. The possessor A who receives the ciphertext Y calculates $$Y\hat{}X \text{ MOD } N$$

with the use of the secret key X which satisfies the equation shown below, $$XE \text{ MOD } (P-1)(Q-1) = 1$$

where (P−1)(Q−1) is the value of Euler function $\phi$(N) in relation to N. This value is equal to the number of natural numbers which are mutually prime with N. According to the Euler's theorem $$Y((P-1)(Q-1) \text{ MOD } N = 1$$

is established. On the other hand, since we are able to write $$XE = 1 + K(P-1)(Q-1),$$

where K is an integer, we obtain, $$Y\hat{}X \text{ MOD } N = L\hat{}(XE) \text{ MOD } N$$
$$= L\hat{}(1 + K(P-1)(Q-1)) \text{ MOD } N$$
$$= L * L\hat{}(K(P-1)(Q-1)) \text{ MOD } N$$
$$= L$$

Therefore, by the calculation of "Y^X MOD N" the possessor A is able to restore the original plaintext L sent from the transmitter B. In this case, for the calculation of the secret key X, prime factors P and Q of N, are used. At present, a method for calculating X without using the prime factor dissolution is not known, and to factorize a product of large primes numbers requires tremendously long period of time. Thus even if N is opened to the public, the secret key of A is safe.

The representative implementation method of the modular exponentiation calculation to be used in the encryption/decryption operation in RSA cryptosystem is the addition chain method and the sliding window method.

Figure 4:
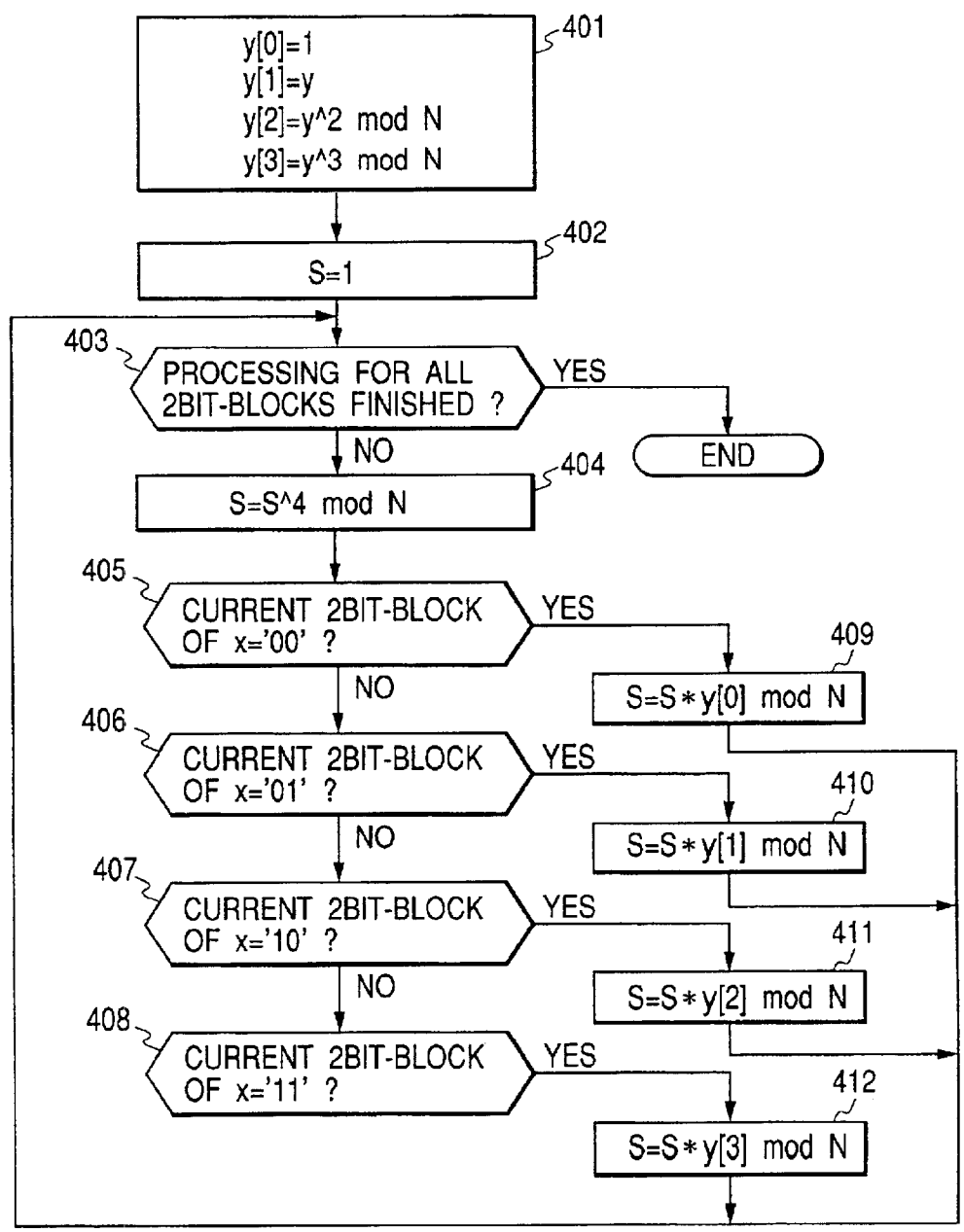
FIG. 4 is a view showing processing procedures of modular exponentiation calculation (addition chain method of window width 2 bits)

At first, on the calculation algorithm in the addition chain method, explanation will be given referring to FIG. 4. This method is utilized most frequently. In this method, the bits in the secret key X are divided into 2 bit blocks; according to the block value which is any of 00, 01, 10 or 11, Y[0]=1, Y[1]=Y, Y[2]=Y^2 MOD N or Y[3]=Y^3 MOD N is applied respectively to X in the descending order from the highest; and by performing the modular multiplication calculation, the calculation of Y^X MOD N is realized. In the above, the division into 2 bit blocks is made for the convenience of explanation. In actual cases, blocks of 1 bit, 3 bits or 4 bits may be possible. The concept of the method is the same.

At first, a bit table is prepared in the followings, Y[0]=1, Y[1]=Y, Y[2]=Y^2 MOD N, Y[3]=Y^3 MOD N (step 401). Subsequently, initialization is performed (step 402), at a conditional branch (step 403) it is judged whether the process is finished to the last bit block of the index x. If the process is finished, processing procedure is terminated, and if not 4th power calculation will be performed (step 404). This 4th power calculation (step 404) is performed irrespective of the bits of x, but in the modular multiplication calculation to be executed in the next steps conditional branch processes are performed (steps 405, 406, 407, 408) and corresponding to respective conditions, modular multiplication calculations are performed in steps 409, 410, 411, 412.

It will be confirmed simply that a correct calculation can be performed with this method by a numerical example. Since the essential part of this calculation method is an index portion, a following equation will be cited as an example with numerical value only in index portion.

$$S = Y\hat{}219 \text{ MOD } N$$

By the binary expression, 219 is expressed 11011011. Based on this example, calculation will be made by the addition chain method of 2 bit width. When 11011011 is divided into 2 bit blocks, 11, 01, 10, 11 are obtained. Initialization is performed (S=1), and then the 4th power of this in modulus N is obtained. The 4th power of 1 is equal to 1. Next, pick up the leading bit block in the index portion. Since it is 11, S is multiplied by Y[3]=Y^3 MOD N, and S=Y^3 MOD N is obtained. Next, looped back and by the 4th power of this in modulus N, Y^12 MOD N is obtained. Then pick up the second bit block from the beginning of the index portion. Since it is 01, S is multiplied by Y[1]=Y and S=Y^13 MOD N is obtained. Looped back again and by the 4th power of this in modulus N, S=Y^52 MOD N is obtained. Then pick up the third bit block from the beginning of the index portion. Since it is 10, S is multiplied by Y[2]=Y^2 MOD N, and S=Y^54 MOD N is obtained. Looped back again and by the 4th power of this in modulus N, S=Y^216 MOD N is obtained. Then pick up the fourth bit block of the index portion. Since it is 11, S is multiplied by Y[1]=Y^3 MOD N, and S=Y^219 MOD N is obtained. This is a solution to be found.

Figure 5:
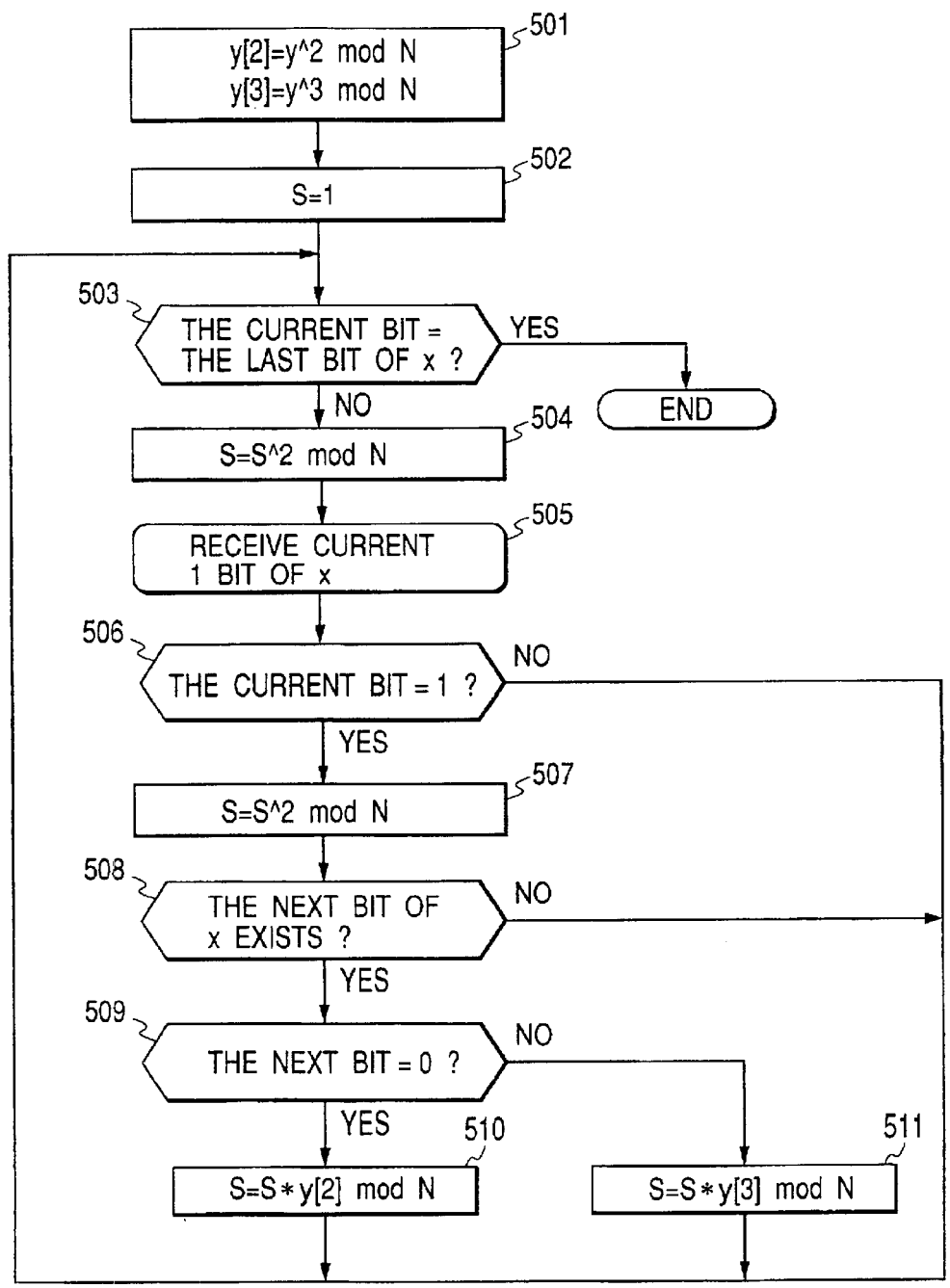
FIG. 5 is a view showing processing procedures of modular exponentiation calculation (sliding window method of window width 2 bits)

Next, sliding window method as another representative modular exponentiation algorithm, will be explained referring to FIG. 5. In this example, the maximum processing unit of X when calculating Y^X MOD N is assumed to be 2 bits. At first, a table of Y[2]=Y^2 MOD N and Y[3]=Y^3 MOD N are prepared (step 501). Next, S is initialized to 1 (step 502), and then it is judged if the process has been executed on the last bit block of the index X (step 503). If finished, the processing is terminated and if it is not, modular square arithmetic operation is executed (step 504). Pick up 1 bit of the index x (step 505) and if it is not 1, the processing procedure is returned to the conditional branch process (step 503). If this bit is 1, modular square arithmetic operation is executed (step 507). Next, it is judged if the next bit of X is obtained or not (step 508), and if not the processing procedure is returned to the conditional branch process (step 503), but in this case the process has been finished up to the last bit block of X. Thus the condition at step 503 becomes "YES" and the process is terminated. In a case where the next bit block of X is obtained, at the conditional branch process (step 509), corresponding to the fact that the bit is 1 or 0, modular square arithmetic operation is respectively executed (steps 510, 511) and the processing procedure is returned to the conditional branch process (step 503).

This process will also be confirmed numerically. As an example following expression will be cited. When we calculate $$S=Y^{2226} \text{ MOD } N,$$

a table of Y[2]=Y^2 MOD N and Y[3]=Y^3 MOD N is prepared. In this case Y[0], Y[1] are not necessary. A numeral 2226 is written 100010110010 in binary notation. Examine this bit string in the descending order, and when a 2 bit block has 1 in the higher order, we regard it as one group, and when independent 0 continues, it is assumed that modular square arithmetic operation is executed. In short, we understand that 100010110010 can be resolved into 10, 0, 0, 10, 11, 0, 0, 10. Therefore, after the initialization to S=1, at first, the process which corresponds to 10, that is, modular square arithmetic operation of S is executed, thereby S is multiplied by Y[2]. In this case we put S=Y[2]=Y^2 MOD N. Next, the process which corresponds to 0, that is, modular square arithmetic operation is executed, and we obtain S=Y^4 MOD N. The process corresponding to the adjoining 0, S=Y^8 MOD N, is executed. Next when the process for 10 is executed, we obtain S=((Y^8 MOD N)^4 MOD N*Y^2 MOD N) MOD N=Y^34 MOD N. In the following process, corresponding to 11, S=((Y^34 MOD N)^4*Y^3 MOD N) MOD N=Y^139 MOD N is executed. Further corresponding to the 2 succeeding 0's, 4th power modular arithmetic operation is executed, and we obtain S=(Y^139 MOD N)^4 MOD N=Y^556 MOD N, and in the final step, corresponding to the last 10 we obtain S=((Y^556 MOD N)^4 MOD N*Y^2 MOD N) MOD N=Y^2226 MOD N. Thus a solution to be found is obtained. Since in this method only the index bits having the leading bit of 1 is placed on a table, the capacity of RAM required for that is half of that of other methods.

Note that the above-mentioned addition chain method and sliding window method may be executed with the use of a technique called Montgomery method. Montgomery method is one to be used for the high speed execution of the modular multiplication arithmetic operation, AB MOD N. In particular the Montgomery method is suited to implementation by hardware. The algorithm of the method will be briefly explained. On the detailed description, refer to Montgomery, "Modular Multiplication Without Trial Division", Mathematics of Computation 44, 170, pp. 519–521 (1985).

The essence of Montgomery method lies in utilizing the fact that in almost all computers the arithmetic operation of MOD 2^N can be realized by neglecting higher order bits. In other words, the essence of Montgomery method lies in that the calculation of AB MOD N is replaced by arithmetic operations in modulus (power of 2). In RSA cryptosystem, since N is a product of large primes, it is an odd number; therefore it is mutually prime with arbitrary power of 2. Then we are able to consider a diophantine equation having unknowns, M and W, $$AB+MN=WR$$

where it is assumed that the bit length of A and B is N, and R=2^N. In this case this equation has infinite number of solutions. If we are able to find M like this, W is congruent with ABR^(-1) MOD N. Since M's are arranged regularly with intervals of an R, it is able to take a non-negative value smaller than the value of R. In this case, W takes the value of ABR^(-1) MOD N or ABR^(-1) MOD N+N. In the case of the latter, N is subtracted from W to obtain a target solution.

As shown in the above, in the Montgomery method, arithmetic operation is performed in the form of ABR^(-1) MOD N. Therefore, in the above-mentioned algorithm, for example, in table preparation process executed in 401 shown in FIG. 4 for the addition chain method and in 501 shown in FIG. 5 for the sliding window method, the values of respective table are replaced by the values, Y[0]=R MOD N, Y[1]=Y*R MOD N, Y[2]=Y^2*R MOD N, Y[3]=Y^3*R MOD N for the succeeding processing. The initial value of S is also set to be R MOD N. Then the values of the multiplicand A and the multiplier B become R times of the original value respectively; therefore, in the process of ABR^(-1) MOD N, a term of R times remains. If we call this format Montgomery format, both addition chain method and sliding window method, are executed in Montgomery format and at the final step multiplying by R^(-1) MOD N we are able to obtain a solution to be found.

Next, for the conveniences of later explanation, a brief explanation on the overflow processing in the modular multiplication process will be given. Although there are slight difference among the overflow processing according to the implementation of processing units, a representative one will be explained. The simplest method is that, at first, A*B is calculated and if the result is less than N, A*B is made a solution, and if A*B is larger than N, N is subtracted from the product until the result becomes less than N; thus A*B MOD N can be obtained. In short, in this case the "overflow" means that A*B is equal to or becomes larger than N, and the "overflow processing" means nothing but the processing to perform subtraction of N from the A*B until it becomes less than N. In this method, as far as the bit length of A*B is short the amount of coding is small and the processing time is also negligible, whereas when the bit length becomes large, the processing time becomes very large with a powerless device like IC card, resulting in that this method is not often utilized.

Another problem is the overflow which occurs in Montgomery method. Previously as explained briefly, noticing that in Montgomery method it is faster to try to find the remainder in modulus $R=2^{\wedge}N$ (N shows the number of bits of A and B) than to calculate a remainder in modulus N (odd number), the calculation of $A*B*R^{\wedge}(-1) \text{ MOD } N$ is converted to the operation to find $M=-A*B*N^{\wedge}(-1) \text{ MOD } R$ in the above-mentioned diophantine equation:

$$AB+MN=WR,$$

There is one M in the range of 0 to R−1. Finding M does not mean that the value of the expression, $A*B*R^{\wedge}(-1) \text{ MOD } N$, is determined (Hereinafter it will be referred to as Montgomery equation). If A, B result in the remainder in modulus N, we have A < N < R, and also B < N < R, and also we have M < R. Therefore, $$W=(AB+MN)/R \text{ \< } (NR+RN)/R=2N$$

In short, W is smaller than 2N but W may be larger than N. Actually such a case exists. In that case, N shall be subtracted once. In this case, "overflow" means W becomes larger than N, and "overflow processing" means the operation to subtract N once.

In the case of RSA-cryptosystem, it is clear that an operation of modular multiplication arithmetic operation appears, but in the case of an elliptic curve cryptosystem, it is not an evident matter. Thus a brief explanation will be given on the elliptic curve cryptosystem. An elliptic curve is a set of zero points of a polynomial of the third order defined on field K. When the characteristic is not 2, it has a canonical form, $$Y^{\wedge}2=X^{\wedge}3+AX+B$$

On the field having the characteristics 2, an elliptic curve has a canonical form, $$Y^{\wedge}2+CY=X^{\wedge}3+AX+B, \text{ or}$$

$$Y^{\wedge}2+XY=X^{\wedge}3+AX+B$$

Figure 6:
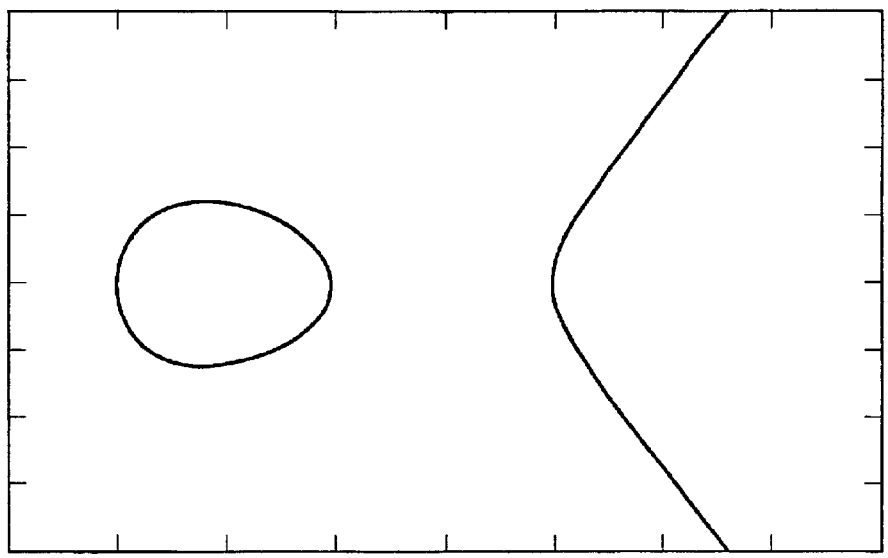
FIG. 6 is a view showing a shape of an elliptic curve.

(In both cases, a point at infinity 0, to be explained later, shall be included in consideration) The shape of an elliptic curve is shown in FIG. 6.

Cryptosystem requires only finite field (Galois field) as the defined field, so that only the case will be explained. A field composed of a finite number of elements is called a finite field or Galois field, and the structure is well known. Their simplest constitution is shown below. At first, let us consider a residue ring ZP of an integer ring with a prime P being modulus. The ZP, as a set, coincides with {0, 1, 2, - - - , P−1}. The sum (+) and product (*) in ZP are defined as shown below, $$A(+)B=(A+B) \text{ MOD } P$$

$$A(*)b=(A*B) \text{ MOD } P$$

Every element except 0 has the inverse element with respect to (*), and it has a structure of a field. This is called a prime field and is written GF(P). This is the most primitive example of a finite field. In the following, as far as there may occur no confusion, (+) will be written + as usual, and (*) will be also expressed by * as usual. About a product, A*B may be written as AB.

Next, let us consider a polynomial F(X) having the elements of GF(P) as its coefficients, and a new field can be constituted by adding what is not included in GF(P) among the zero points to GF(P). This is called a finite degree algebraic extension field of GF(P). It is known that the number of elements in a finite degree algebraic extension field of GF(P) is a power of P. When the number of elements is written P^N, the finite degree algebraic extension field may be expressed as GF(P^N).

According to the homomorphism theorem (Kazuo Matsuzaka, "Daisuu Nyuumon" p. 125, Iwanami), GF(P^N) is isomorphic with a residue ring GF(P) [X]/(F(X)) concerning the ideal produced by the whole multiple of F(X)— irreducible polynomial of degree N of a ring GF(P) [X] produced by the whole polynomial of GF(P) coefficients. In this case, as far as the F(X) is irreducible, it belongs to the same ring. Therefore, we are able to decide a proper irreducible polynomial of degree N, and similar to the case of ZP, by defining the sum and product as the sum and product at MOD F(X), the operation of GF(P^N) can be realized on a microcomputer.

For the implementation on an IC card, in particular the case of the prime field GF(P)(P is a prime) and the case of binary field GF(2^N) are important. There is a method to realize GF(P^N) by making the size of P to the order of a register size in a microcomputer, and now the researches therefor are under development.

Figure 7:
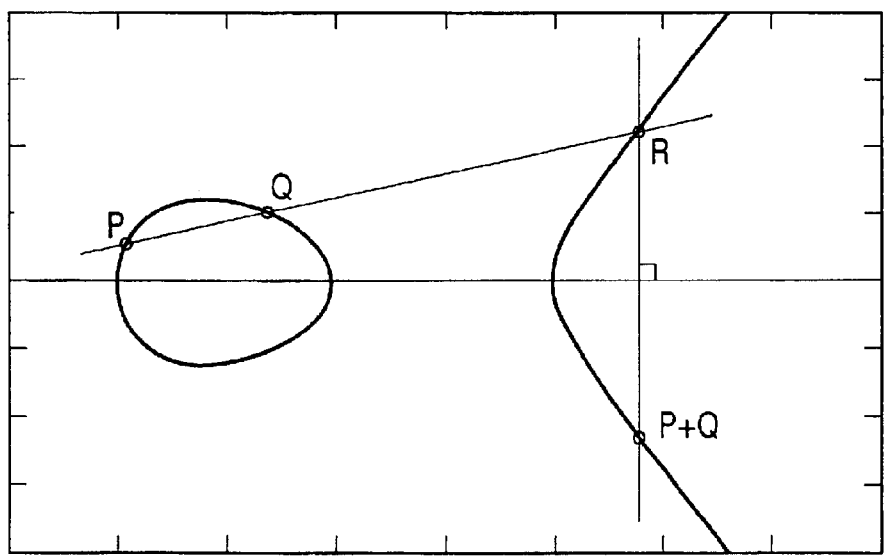
FIG. 7 is an illustrative view for explaining the addition on an elliptic curve.

Between the points on an elliptic curve, an arithmetic operation can be defined. As shown in FIG. 7, when there are 2 points P and Q on an elliptic curve, draw a straight line through these 2 points (When P=Q, draw a tangent line). Put the intersection point of the straight line with another elliptic curve as R. Because of the symmetry of the curve, the symmetrical point of R with respect to the x axis is also a point on the elliptic curve. This point is written as P+Q and is defined as the "sum" of P and Q. When there is no intersecting point, we consider, as a virtual point, a point at infinity and regard that the straight line and the elliptic curve intersect at the virtual point. We write the infinity point as 0. A point which is at a symmetric position of a point P on an elliptic curve with respect to x axis is called an inverse element of P, and expressed with −P. With the use of this "sum", what is made by adding a point P K times is written as KP. What is made by adding a point −P K times is written as −KP. KP or −KP is called a scalar multiple of P. The coordinates of these points can be expressed by rational expressions of the coordinates of points P and Q; therefore, it is possible to consider these arithmetic operations on a general field. This "summation" is similar to ordinary summation, where the combination law and the commutative law are established. Concerning this summation, the point at infinity 0 plays a role of 0 in the same way as an operation with ordinary numbers. When −P is added to P, 0 can be obtained. This shows that an additional operation on an elliptic curve has a structure of Abelian group. This may be called a Mordell-Weil group. When an elliptic curve E and a defining field GF(Q)(Q=P^N) are fixed, Mordell-Weil group may be written G(E/GF(Q)). The structure of G(E/GF(Q)) is very simple, and it is known that it becomes an isomorphim of a cyclic group or a direct product of 2 cyclic groups. From the point of view of cryptology, in a case where it is in the form of a cyclic group or of a direct product of 2 cyclic groups, it is desirable that the order of either of them (the original number) is divisible by a large prime.

Put the coordinates of the sum of a point P=(X1, Y1) and a point Q=(X2, Y2), P+Q, as (X3+Y3). When P+Q is not zero, the expression shown below is established. In the case of an IC card, there is no positive reason to use characteristic 3, so that in the following the case of characteristic 3 is omitted. The elliptic curves considered in the following are assumed to be non-singular ones.

In the case where characteristic is not 2 nor 3: for $Y^2 = X^3 + AX + B$,
we obtain $$X3 = H^2 - X1 - X2,$$

$$Y3 = H(X1 - X3) - Y1,$$

where H=(Y2−Y1)/(X2−X1), when P is not equal to Q, and H=(3X1^2+A)/(2Y1), when P is equal to Q.

In the case where characteristic is 2: for $Y^2 + XY = X^3 + AX + B$,
we obtain $$X3 = H^2 + H + X1 + X2 + A$$

$$Y3 = H(X1 + X3) + X3 + Y1,$$

where H=(Y1+Y2)/(X1+X2), when P is not equal to Q, and H=X1+(Y1/X1), when P is equal to Q.

In the above equation of addition, operation shall be performed on the Galois field GF (P^N). Therefore, for example, on GF(P)(P is a large prime) following expressions will be executed, $$X3 = (H^2 - X1 - X2) \text{ MOD } P$$

$$Y3 = (H(X1 - X3) - Y1) \text{ MOD } P$$

The calculation of H is also has to be performed on the MOD P. In short, H=(Y2−Y1)/(X2−X1) can be interpreted as H=(Y2−Y1)*{(X2−X1)^(−1) MOD P} MOD P.

Also in the case of GF(P^N), as mentioned above, finally we have to perform modular multiplication calculation of a polynomial, and so we are able to understand in the similar way.

In general, even if the value of KP=Q is known, it takes an enormous amount of computation to find out the value of K. Thus K is not easily found out. It is called a discrete logarithm problem on an elliptic curve. An elliptic curve cryptosystem utilizes the difficulties in the discrete logarithm problem on an elliptic curve. There are many kinds of cryptosystems which utilize an elliptic curve. In this place, in particular, elliptic Elgamal technique will be explained. It is assumed that the elliptic curve E and a point P on the elliptic curve (generally, a point having a large order, called a base point) are opened to the public.

It is assumed that Mr. A is going to transmit secret information M to Mr. B (The information M is expressed with a point on an elliptic curve. On the embedding of a plaintext (ciphertext) on an elliptic curve, explanation is given in Neal Koblitz, "A Course in Number Theory and Cryptography", Graduate Texts in Mathematics 114, Springer-Verlag, 1994, pp. 253.)

Step 1. A receiver Mr. B selects a positive integer X[B], and he keeps it as a secret key, and registers Y[B]=X[B]P to the public key register.

Step 2. Transmitter Mr. A transmits the following values to Mr. B with the use of a random number R, $$C1 = RP$$

$$C2 = M + RY[B]$$

Step 3 Receiver Mr. B receives C1 and C2, and restores M with the use of his secret key X[B] as shown below, $$C2 - X[B]C1 = M$$

Figure 8:
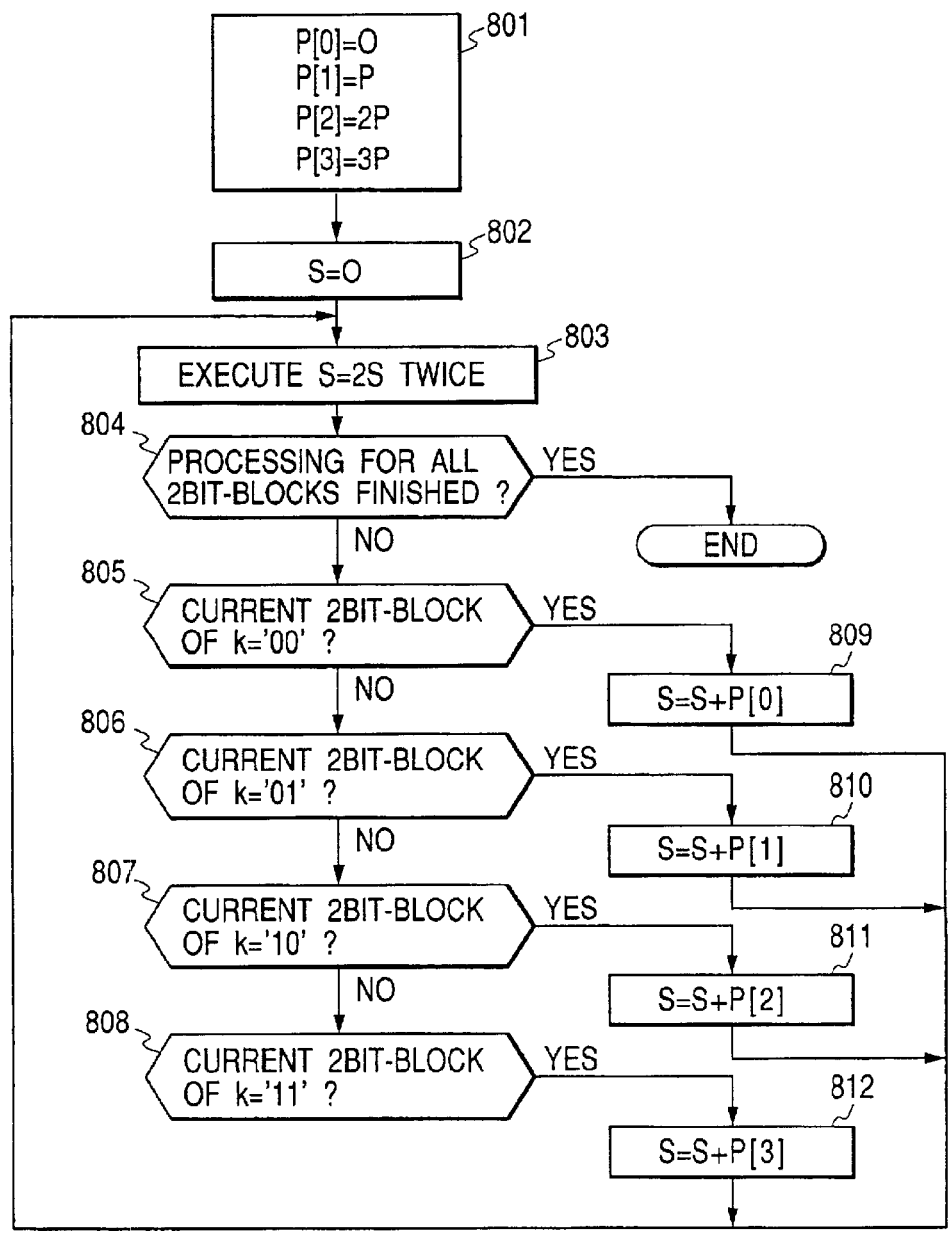
FIG. 8 is a calculation algorithm (addition chain method of 2 bits) of scalar multiple of a point P on an elliptic curve.

Irrespective of the elliptic Elgamal cryptosystem, in the elliptic curve cryptosystem, it is necessary to calculate the scalar multiple of a point on the elliptic curve. The algorithm for finding the scalar multiple of a point on an elliptic curve is similar to the modular exponentiation calculation. A standard algorithm for calculating KP (K is a positive integer), in the similar way to the modular exponentiation calculation, will be explained in which processing is performed on every two bit blocks as shown in FIG. 8. At first, in order to process 2 bits at a time, a table of the base point P is prepared. In the modular exponentiation operation, corresponding to 0 power, 1 power, 2 power, 3 power in MOD N, 0 (point at infinity), P, 2P, 3P are prepared (step 801). Different from the case of modular exponentiation operation, this table does not need to be rewritten as necessary, but it can be prepared beforehand. Next, the value of a point for calculation is initialized (step 802). Next, after the twice of point S is calculated (step 803), it is judged if the process has been executed until the last bit of K is reached (step 804), and if not, a conditional branch is taken according with 2 bit value of K (steps 805, 806, 807, 808), and the corresponding values, points P[0], P[1], P[2], P[3] are added (steps 809, 810, 811, 812). This process is continued up to the last bit of K, and thereby KP can be calculated. This method of calculation is performed by picking up each 2 bits from the highest order. It is known that it has the same structure mathematically as that of the modulus exponentiation calculation. It is also easy to replace it with the sliding window method. We are able to consider that the modular exponentiation operation in RSA or the additional operation on the elliptic curve is the operation performed on the algebraic system, ZN or G(E/GF(Q)). It will be explained later again.

On the other hand, when a microcomputer executes internal programs, there is a possibility that the power being consumed leaks outside. When this process is realized by a microcomputer, the process on a secret key might be exposed to a threat of leak. For example, according to the bit block value of K (in this example, every 2 bits) corresponding branch is taken. If the process is revealed as the change in consumption current, the bits of K might be identified from the current waveform.

Figure 9:
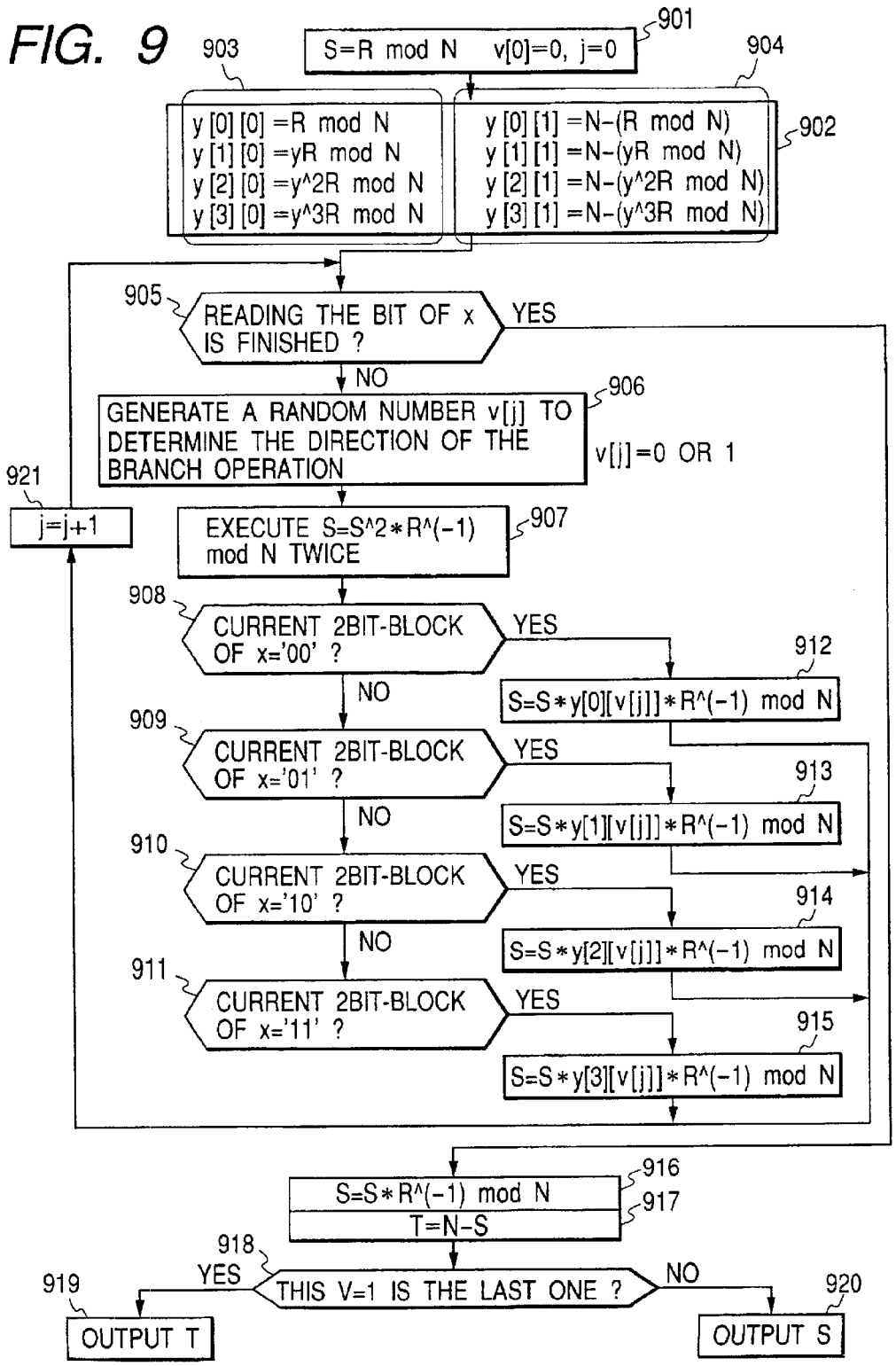
FIG. 9 is a view showing processing procedures in a first embodiment in a case where the present invention is applied to a modular exponentiation calculation in which Montgomery method is used.

Considering the above circumstances, the embodiments according to the present invention will be explained. The process shown in FIG. 9 is a typical application example of the present invention. The present embodiment shows the execution of a modular exponentiation calculation, Y^X MOD N, by the addition chain method. However, in the present embodiment, modular exponentiation calculation in RSA cryptosystem is performed with the use of modular multiplication processing by Montgomery method. In this process, the modular multiplication arithmetic operation called A*B*R^(−1) MOD N is used. As described above, N denotes an odd number (generally, in RAS cryptosystem, N is a product of large primes P and Q and an odd number), and R=2^N (N denotes the bit length of the data).

At first, in step 901, after putting S=R MOD N, a counter J for counting the number of the bit blocks of X is initialized to 0, and the variable V[0] for judging the conditional branch is put 0. Next, the tables for processing in 2 bit addition chain method are prepared (step 902). In this case, in addition to the original table (903) which is necessary for an ordinary addition chain process, Y[0][0]=R MOD N, Y[1][0]=YR MOD N, Y[2][0]=Y^2R MOD N, Y[3][0]=Y^3R MOD N, an inversion table (904) in modulus N, Y[0][1]=N−(R MOD N), Y[1][1]=N−(YR MOD N), Y[2][1]=N−(Y^2R MOD N), Y[3][1]=N−(Y^3R MOD N) is also prepared. The tables usually exist on a RAM. After the completion of these tables, at the conditional branch process (step 905), it is examined if the index x has been read up to the last bit (if all bits have been picked up). If the process of all bit blocks have not been finished, the process is advanced to step 906 to generate random numbers [J] (step 906). This random number is 0 or 1. Next, S=S^2*R^(−1) MOD N is executed twice (step 907). Since at the first step, S is initialized to S=R MOD N, the result of the modulus square arithmetic operation becomes S=(R MOD N)^2*R^(−1) MOD N=R MOD N. Note that the processing result of step 907 becomes R MOD N. Next, at conditional branch processes (steps 908, 909, 910, 911), 2 bit block of the index x is read. Corresponding to the value of the bit block: 00, 01, 10, or 11 in binary notation (in the figure the block is expressed "2 bit-block of x"), process is branched to step 912, 913, 914 or 915 to perform modular multiplication arithmetic operation. In this modular multiplication arithmetic operation, corresponding to whether V[J] is 0 or 1, different value on the table is used. For example, if the bit block of X is 10, in an ordinary case, S=S*Y[2][0]*R^(−1) MOD N=S*(Y^2R MOD N) MOD N is calculated, but when V[J]=1, Y[2][1] is taken out from the inversion table to calculate S=S*Y[2][1]*R^(−1) MOD N=S*(N−(Y^2R MOD N))*R^(−1) MOD N (step 914). Also in the process of step (912, 913 or 915) according to the value of V[J] the value of multiplier is changed. After finishing the modular multiplication arithmetic process, at step 921, the counter is incremented and the process is returned to step 905. At the conditional branch process (step 905), when all bit blocks of index x have been read, the procedure is advanced to the process of step 916. In step 916, a process of multiplying R^(−1) MOD N is performed in order to return the data in Montgomery format (data multiplied by R MOD N) to the ordinary value. Next, T=N−S is calculated and the result is put on a RAM (step 917). The S and T are stored on the different areas on the RAM, and the duplication shall not occur on the RAM. In the conditional branch (step 918), if the last value of V is 1, T is output (step 919) and if V=0, S is output (step 920). It is obvious that a correct value is output because of the fact that (tN−B)^2 MOD N=B^2 MOD N (t is an integer).

By the processes as described above, the overflow processing becomes the one different from the original one. Thus it becomes difficult to estimate an internal processing by the observation of the power consumption or the processing time. When A in the A*B MOD N is substituted with SN+A*(−1)^F, and B in the A*B MOD N is substituted with TN+B*(−1)^G (s, t, f, g are integers), this is an example of especially putting (S, T, F, G)={(0, 0, 0, 0), (0, 1, 0, 1)} (inside the { } are shown the elements of a set).

Figure 10:
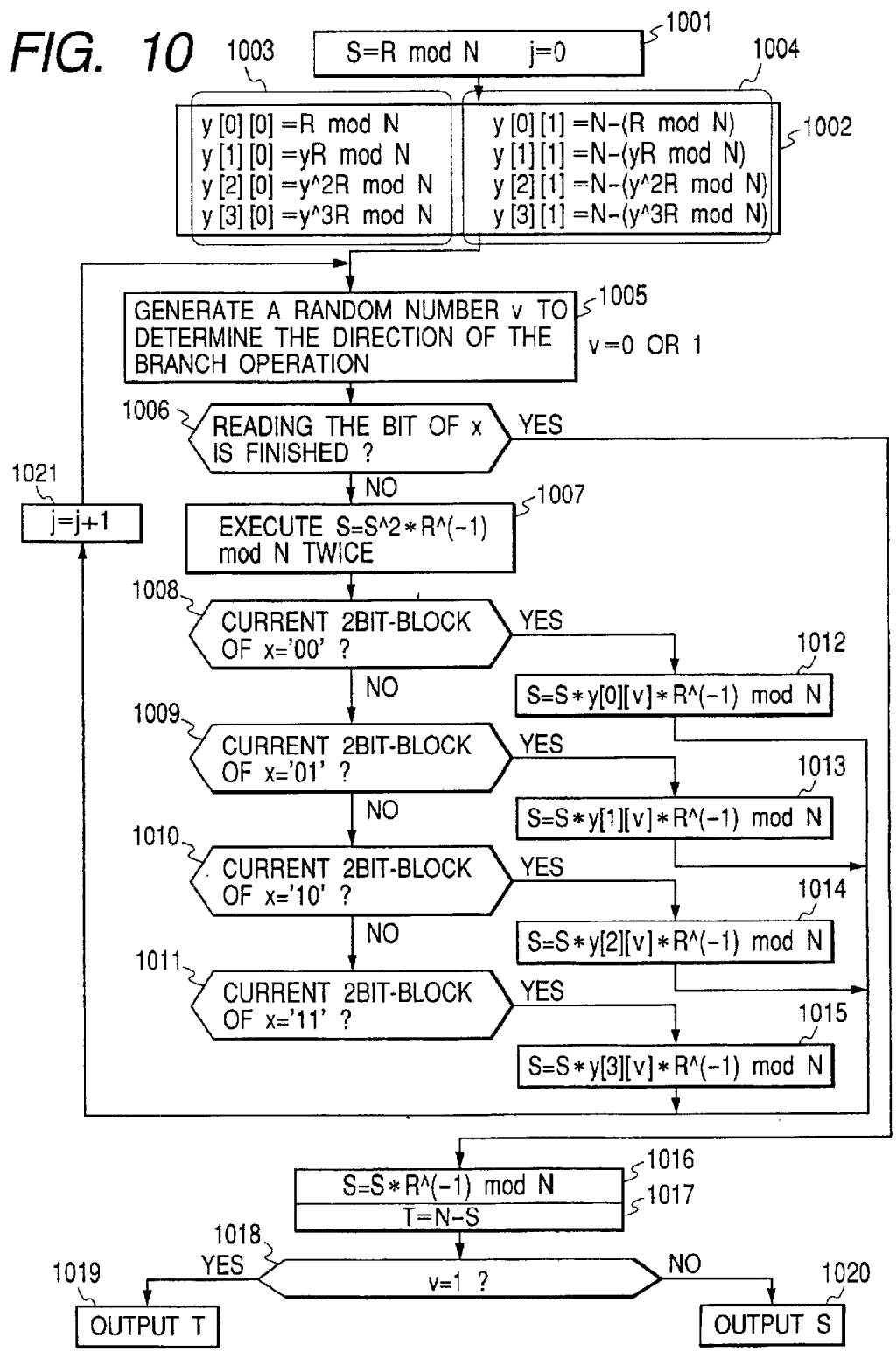
FIG. 10 is a view showing processing procedures in a second embodiment in a case where the present invention is applied to a modular exponentiation calculation in which Montgomery method is used.

In the above embodiment, V[J] is varied concerning each J as a random number, but there is a method in which the value of J, J=0, 1, - - - , M−1 (M shows the number of bit blocks) is randomly predetermined to be 0 or 1 from the beginning. This is shown in FIG. 10. At first, at step 1001, after putting S=R MOD N, a counter J for counting the number of bit blocks of X is initialized to 0. Next the tables for processing 2 bit addition chain method are prepared (step 1002). In this case, in addition to the original table (1003) which is necessary for an ordinary addition chain process, Y[0][0]=R MOD N, Y[1][0]=YR MOD N, Y[2][0]=Y^2R MOD N, Y[3][0]=Y^3R MOD N, an inversion table (1004) in modulus N, Y[0][1]=N−(R MOD N), Y[1][1]=N−(YR MOD N), Y[2][1]=N−(Y^2R MOD N), Y[3][1]=N−(Y^3R MOD N) is also prepared. The tables are usually on a RAM. After the preparation of the tables, the process is advanced to step 1005 to generate random numbers V. This random number is 0 or 1. Next, at conditional branch (step 1006), it is examined if the index x has been read up to the last bit block (if all bit blocks have been picked up). Next, S=S^2*R^(−1) MOD N is executed twice (step 1007). At the first process, since S is initialized to R MOD N, note that S becomes S=(R MOD N)^2*R^(−1) MOD N=R MOD N by modular square exponentiation. Next, at conditional branch processes (steps 1008, 1009, 1010, 1011), 2 bit block of the index x is read. According to the value of bit block: 00, 01, 10, or 11 in binary notation, process is branched to step 1012, 1013, 1014, 1015 to perform modular multiplication arithmetic operation. In the modular multiplication arithmetic operation, according to whether V is 0 or 1, different table value is used. For example, when the bit block of X is 10, in an ordinary case, S=S*Y[2][0]*R^(−1) MOD N=S*(Y^2R MOD N) MOD N is calculated, but when V=1, Y[2][1] is taken out from the inversion table to calculate S=S*Y[2][1]*R^(−1) MOD N=S*(N−(Y^2R MOD N))*R^(−1) MOD N (step 1014). Also in the process of step 1012, 1013, 1015, the value of multiplier is changed corresponding to the value of V. After finishing the modular multiplication arithmetic process, at step 1021 the counter is incremented, and the process is returned to step 1005. At the conditional branch process (step 1006), when all bit blocks of index x have been read up to the last bit block, the procedure is advanced to the process of step 1016. In step 1016, in order to return the data in Montgomery format (data multiplied by R MOD N) to the ordinary value, a process of multiplying R^(−1) MOD N is performed. Next, T=N−S is calculated and the result is put on a RAM (step 1017). Now, S and T are stored on the different areas on the RAM, and they shall not be in duplication. In the conditional branch (step 1018), when the last value of V is 1, T is output (step 1019), and when V is 0, S is output (step 1020). It is clear that a correct value is output by this process as seen from the fact that (tN−B)^2 MOD N=B^2 MOD N (t is an integer).

By the process as described above, the overflow processing becomes different from the original one, so that it becomes difficult to estimate an internal processing by the observation of power consumption or the processing time of an IC chip. When A and B in the modular multiplication operation A*B MOD N are substituted with the values mentioned in the above, this is an example of especially putting (S, T, F, G)={(0, 0, 0, 0), (0, 1, 0, 1)}.

Figure 11:
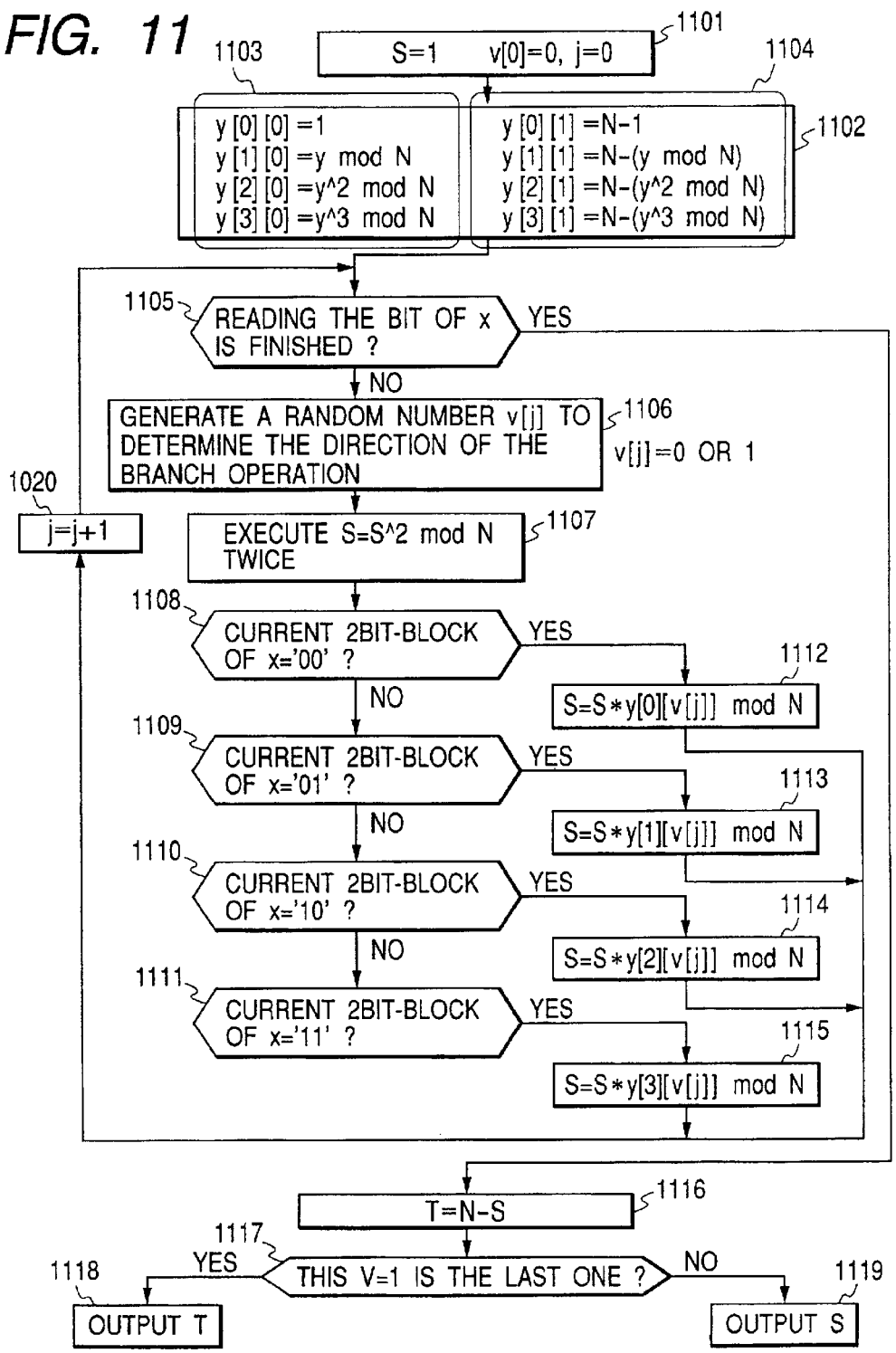
FIG. 11 is a view showing processing procedures of a first embodiment in a case where the present invention is applied to an ordinary modular exponentiation calculation.

In the above 2 embodiments, examples in which Montgomery method is used are cited; however it is easy to apply the present invention to a method other than Montgomery method. An example will be shown in the following. It is quite easy to change the embodiment shown in FIG. 9 to a non-Montgomery method, and it suffices to eliminate a part where data are converted to Montgomery format. FIG. 11 shows an ordinary implementation method for which Montgomery method is not used.

At first, at step 1101, after putting S=1, and a counter J for counting the number of bit blocks of X is initialized to 0, and further the variable V[0] is set to 0. Next, the tables for processing 2 bit addition chain method are prepared (step 1102). In this case, in addition to the original table (1103) which is necessary for an ordinary addition chain process, Y[0][0]=1, Y[1][0]=Y MOD N, Y[2][0]=Y^2 MOD N, Y[3][0]=Y^3 MOD N, an inverse table in modulus N (1104), Y[0][1]=N−1, Y[1][1]=N−(Y MOD N), Y[2][1]=N−(Y^2 MOD N), Y[3][1]=N−(Y^3 MOD N), is also prepared. The tables usually exist on a RAM. After the preparation of the tables, at conditional branch (step 1105), it is examined if the index x has been read up to the last bit block (if all bit blocks have been picked up). If the process of all bit blocks of the index x is not finished, the process is advanced to step 1106 to generate random numbers V[J]. The random number is 0 or 1. Next, S=S^2 MOD N is executed twice (step 1107). Next, at conditional branch processes (steps 1108, 1109, 1110, 1111) 2 bit block of the index x is read. According to the value of bit block: 00, 01, 10 or 11 in binary notation (in the figure, it is expressed as a bit block of x), process is branched to step 1112, 1113, 1114 or 1115 to perform modular multiplication arithmetic operation. In the modular multiplication arithmetic operation, according to whether the value of V[J] is 0 or 1, different table value is used. For example, when the bit block of X is 10, in the ordinary case, S=S*Y[2][0] MOD N=S*(Y^2 MOD N) MOD N is calculated, but when V[J]=1, Y[2][1] is taken out from the inversion table to calculate S=S*Y[2][1] MOD N=S*(N−(Y^2 MOD N)) MOD N (step 1114). Also in the process of step 1112, 1113, 1115, the value of a multiplier is changed according to the value of V[J]. After finishing the modular multiplication arithmetic processes, at step 1120, the counter is incremented, and the process is returned to step 1105. At the conditional branch process (step 1105), when all bit blocks of the index x have been read up to the last bit block, the procedure is advanced to the process of step 1116. In step 1116, T=N−S is calculated and the result is put on a RAM. S and T are stored on the different areas from each other, and they shall not be placed in duplication. When the last value of V is 1 in the conditional branch process (step 1117), T is output (step 1118) and when V=0, S is output (step 1119). It is clear that by this process a correct value is output from the fact that (tN−B)^2 MOD N=B^2 MOD N (t is an integer). The overflow processing becomes different from the original one by the processes as described above, so that it becomes difficult to estimate an internal processing from the observation of the power consumption or the processing time of an IC chip. When A and B in the modular multiplication operation A*B MOD N are substituted with the values as described above, this is an example of especially putting (S, T, F, G)={(0, 0, 0, 0), (0, 1, 0, 1)}.

In the following, the present invention corresponding to the embodiment shown in FIG. 11 will be briefly explained in the form of method steps. This is a tamper-resistant modular multiplication method for calculating of a modular multiplication, A*B MOD N, which appears during the crypto-processing, utilizing an information processing device comprising:

(1) a step for calculating $S_1 = A*B$ MOD N, (2) a step for calculating $S_2 = \{sN + A*(-1)^f\} * \{tN + B*(-1)^g\}$ MOD N in place of the step (1), (among s, t, f, g, at least one is an integer excluding zero, and f, g are both 0 or 1), (3) a step for selecting (1) or (2) properly, (4) a step for repeating the above steps, (1), (2) and (3) properly and at the last when step (1) is selected, the calculation result $S_1$ is output, and when (2) is selected, in place of $S_2$, $N-S_2$ is output, (5) a step for using $S_1$ and $N-S_2$ as the calculation results of a modular multiplication arithmetic A*B MOD N of a crypto-processing.

Figure 12:
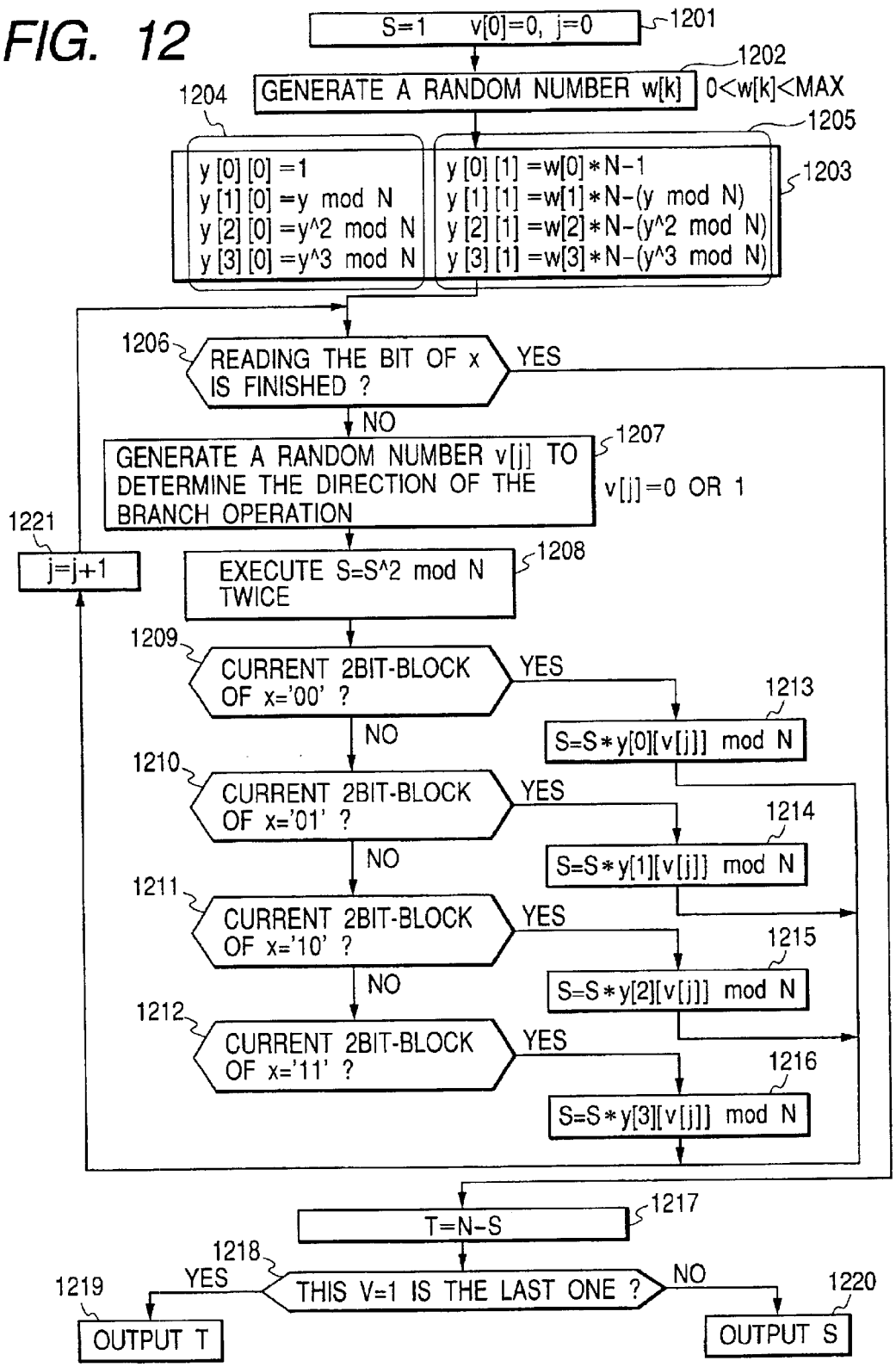
FIG. 12 is a view showing the processing procedures of a second embodiment in a case where the present invention is applied to an ordinary modular exponentiation calculation.

In the above embodiments (shown in FIGS. 9, 10 and 11) random numbers are used as the values of V; however it will be needless to say that for V, method in which 0 and 1 are alternatively set, pseudo-random numbers or chaotic sequences is also capable to be employed. In the above embodiments, S, T, F, G are varied only in 2 ways; however by the variation of more variables, the scramble effect can be achieved. An embodiment in such a case is shown in FIG. 12.

At first, at step 1201, after putting S=1, a counter J for counting the number of bit blocks of the X is initialized to 0, and the variable V[0] for judging the branch conditions is set to 0. Next, 4 random numbers W[K] (K=0, 1, 2, 3) are prepared (step 1202). These random numbers are integers which satisfy 0 < W[K] < MAX, and MAX is determined by the restrictions such as the sizes of memory, register, etc. Next, the tables are prepared for use in the process of 2 bit addition chain method (step 1203). In this case, in addition to the original table (1204) which is necessary for an ordinary addition chain process, Y[0][0]=1, Y[1][0]=Y MOD N, Y[2][0]=Y^2 MOD N, Y[3][0]=Y^3 MOD N, , an inversion table in modulus N (1205), Y[0][1]=N−1, Y[1][1]=N−(Y MOD N), Y[2][1]=N−(Y^2 MOD N), Y[3][1]=N−(Y^3 MOD N) is also prepared. The tables usually exist on a RAM. After the preparation of the tables, at the conditional branch process (step 1206) it is examined if the index x has been read up to the last bit block (if all bit blocks have been picked up). If all bit blocks are not finished, the process is advanced to step 1207 to generate random number V[J]. This random number is 0 or 1. Next, S=S^2 MOD N is executed twice (step 1208). Next, at the conditional branch processes (steps 1209, 1210, 1211, 1212) 2 bit block of the index x is read. According to the value of bit block: 00, 01, 10 or 11 in binary notation (in the figure it is expressed as a bit block of x), process is branched to step 1213, 1214, 1215 or 1216 to perform modular multiplication operation. In the modular multiplication operation, according to whether the value of V[J] is 0 or 1, different table value is used. For example, when the bit block of X is 10, in the ordinary case, S=S*Y[2][0] MOD N=S*(Y^2 MOD N) MOD N is calculated, but when V[J]=1, Y[2][1] is taken out from the inversion table to calculate S=S*Y[2][1] MOD N=S*(N−(Y^2 MOD N)) MOD N (step 1215). Similarly to the above case, in the process in step 1213, 1214, 1216, the value of a multiplier is changed. After the modular multiplication processes are finished, at step 1221, the counter is incremented, and the process is returned to step 1206. At the conditional branch process (step 1206), when all bit blocks of the index x has been read up to the last one, the procedure is advanced to the process of 1217. In step 1217, T=N−S is calculated and the result is put on a RAM. S and T are stored on the different areas from each other on the RAM, and they shall not be duplicated. At the conditional branch process (step 1218), when the last value of V is 1, T is output (step 1219), and when V=0, S is output (step 1220). It is clear that a correct value is output by this process from the fact that (tN−B)^2 MOD N=B^2 MOD N (t is an integer). By the processes as described above, the processing becomes different from the original one, so that it becomes difficult to estimate an internal processing by the observation of the consumption current or the processing time of an IC chip. This is one of embodiments of the present invention. Since this method can be easily modified for Montgomery method, it will be omitted to cite the example.

In the examples shown in the above, multipliers are varied. The spirit of the present invention is not injured by the variation of either of a multiplicand or multiplier, or by the variation of both of them. This is an obvious fact from the mathematical standpoint. However on implementation, some difference occurs. In the case of the variation on the multiplier side, if a table is made once at an initial stage, by only varying the value to be taken out from the table, the present invention can be achieved. However in the case where multiplicand is varied, the multiplicand itself differs during each calculation process, so that in every process of calculation, intermediate results S and N−S must be composed. In order to show this fact an embodiment in which the multiplicand side is varied will be shown.

Figure 13:
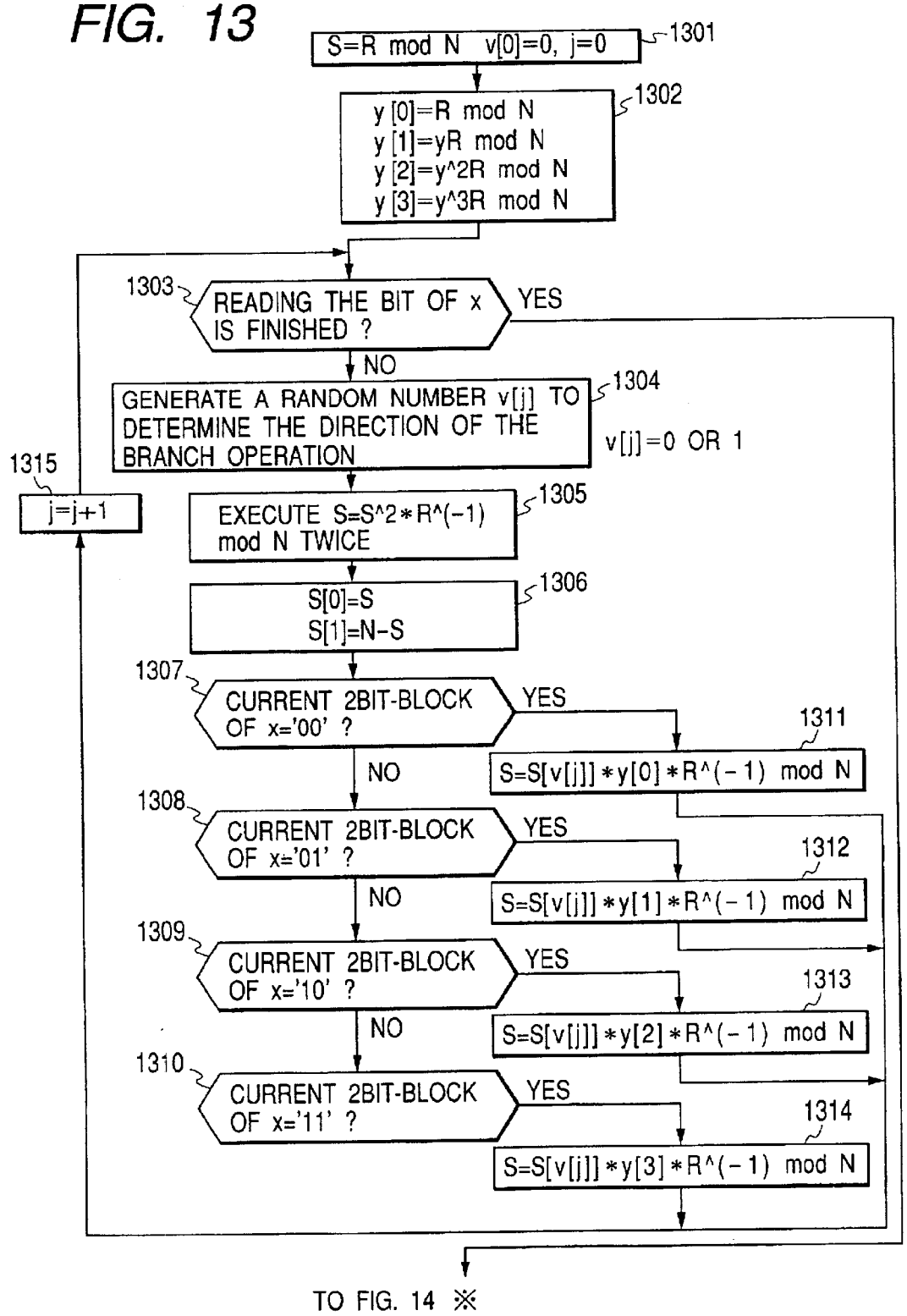
FIG. 13 is a view showing e processing procedures of a third embodiment in a case where the present invention is applied to a modular exponentiation calculation in which Montgomery method is used.
Figure 14:
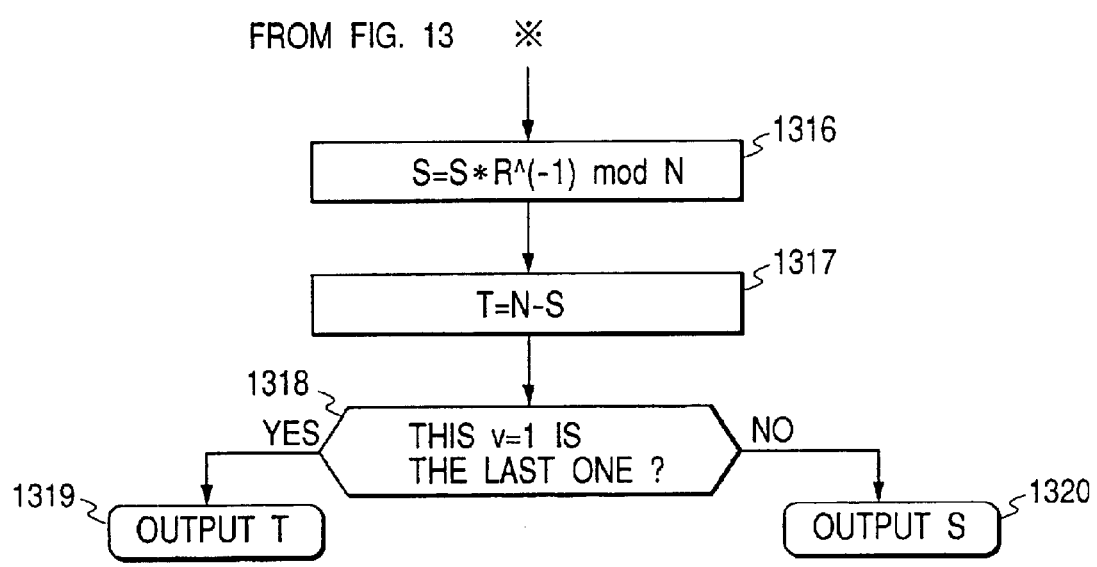
FIG. 14 is a view showing processing procedures of the third embodiment in a case where the present invention is applied to a modular exponentiation calculation in which Montgomery method is used (Continued from FIG. 13)

FIG. 13 will be explained in order. At first, at step 1301, after putting S=R MOD N, further a counter J for counting the number of bit blocks of X is initialized to 0, and the variable V[0] for judging the branch conditions is set to 0. Next, a table to be used for the 2 bit addition chain method process is prepared (step 1302). The table is composed of ordinary table values, Y[0]=R MOD N, Y[1]=YR MOD N, Y[2]=Y^2R MOD N, Y[3]=Y^3R MOD N, and an inversion table to be used for the variation on the multiplier side is not needed. The table usually exists on a RAM. After the preparation of the table, it is examined if the index x has been read up to the last bit block (if all bit blocks have been picked up) at the conditional branch process (step 1303). If the process of the last bit block of the index x is not finished, the process is advanced to step 1304 to generate random number V[J]. This random number is 0 or 1. Next, S=S^2*R^(−1) MOD N is executed twice (step 1305). In the first process, since S is initialized to S=R MOD N, this modular square operation produces S=(R MOD N)^2*R^(−1) MOD N=R MOD N. Note that the result of process of step 1305 is R MOD N. Next, from this S, S[0]=S and S[1]=N−S are calculated and the results are stored on a RAM (step 1306). Next, at the conditional branch processes (steps 1307, 1308, 1309, 1310), 2 bit block of the index x is read, According to the value of the bit block: 00, 01, 10 or 11 in binary notation (in the figure the bit block is expressed as a bit block of x), process is branched to step 912, 913, 914 or 915 to perform the modular multiplication operation. In the modular multiplication operation, according to whether the value of V[0] is 0 or 1 different table value is used. For example, when the bit block of X is 10, ordinarily, S=S[0]*Y[0]*R^(−1) MOD N=S*(Y^2R MOD N) MOD N is calculated, but when V(J)=1, in place of S[0], S[1] is taken out to calculate S=S[1]*Y[2]*R^(−1) MOD N=(N−S)*(Y^2R MOD N)*R^(−1) MOD N (step 1313). For the process in step 1311, 1312 or 1314, similarly to the above, the value of the multiplier is varied according to the value of V[J]. After finishing the modular multiplication process at step 1315, the counter is incremented, and the process is returned to step 1303. In a case where all bit blocks of the index x have been read completely at step 1303, the procedure is advanced to step 1316. At step 1316, to return the data of Montgomery format (data multiplied by R MOD N) to the ordinary value the process to multiply R^(−1) MOD N is performed. Next, T=N−S is calculated and the result is put on a RAM (step 1317). S and T are stored on the different areas from each other on the RAM, and they shall not be duplicated. At the conditional branch process (step 1318), if the last value of V is 1, T is output (step 1319) and if V=0, S is output (step 1320). It is clear that a correct value is output by this process from the fact that (tN−B)^2 MOD N=B^2 MOD N (t is an integer). The overflow processing becomes different from the original one by the processes as described above, so that it becomes difficult to estimate an internal processing by the observation of the power consumption or the processing time of an IC chip. When A and B in the modular multiplication operation A*B MOD N are substituted with the values as mentioned above, this is an example of especially putting (S, T, F, G)={(0, 0, 0, 0), (1, 0, 1, 0). It is easy to modify the above to a method without using Montgomery method. Thus it will be omitted to cite an example.

In the embodiments shown hitherto, a multiplier or a multiplicand is varied. It is needless to say that both of them can be varied. For example, in the process of step 1305 shown in FIG. 13, if the process is performed as S=(N−S)^2*R^(−1) MOD N, the form of the consumption current can be different from the original one. The embodiments according to the present invention comprise various kinds of variations, but essentially it is possible to constitute the variations by the combination of the above described embodiments.

All embodiments mentioned in the above are applied to the processing of the modular exponentiation calculation. The present invention is especially effective for the modular exponentiation calculation, and when the technique described in the above is extended to the more general modular calculation, it will be possible to prevent the secret information from leakage through a processing such as overflow processing. The reason that the present invention is effective is essentially results in the fact that the following relation exists.

$$(tN-B)^2 \text{ MOD } N = B^2 \text{ MOD } N,$$

where t is an integer.

However, in the different process from the modular exponentiation calculation, for example, in the case where the scalar multiple of the base point P on a curve in an elliptic curve cryptosystem has to be calculated, a "natural" modification as the above expression does not always appear. The circumstances will be briefly explained. In a prime field GF(P), (P is a large prime) an elliptic curve E:

$$Y^2 = X^3 + AX + B$$

will be considered. As described above, in the case where the scalar multiple KP of a point P on the curve E is calculated, doubling a point P and the calculation of the sum of points appear (refer to FIG. 8). When these 2 calculations are analyzed in detail, in the case of an IC card or a microcomputer, it is found out that an IC card or a microcomputer has to be subjected to a complicated calculation process more than RSA.

Assume that the coordinates of the sum of a point P=(X1, Y1) and a point Q=(X2, Y2), on an elliptic curve, that is, the coordinate of P+Q is (X3, Y3) as described above. When P+Q is not 0, the following expressions can exist, $$X3 = (H^2 - X1 - X2) \text{ MOD } P$$

$$Y3 = (H*(X1-X3) - Y1) \text{ MOD } P$$

where H=(Y2−Y1)*((X2−X1)^(−1)) MOD P, if P is not equal to Q, and H=(3X1^2+A)*((2Y1)^(−1)) MOD P, if P is equal to Q.

In the group operation of Mordell-Weil group, necessary modular multiplication operation will be enumerated below:

$$H = (Y2-Y1)*(X2-X1)^{\wedge}(-1) \text{ MOD } P \text{ IF } P \neq Q, \tag{E1}$$

$$H = (3X1^2 + A)*(2Y1)^{\wedge}(-1) \text{ MOD } P \text{ IF } P = Q, \tag{E1}'$$

$$H^2 \text{ MOD } P \tag{E2}$$

$$H*(X1-X3) \text{ MOD } P \tag{E3}$$

In the process of (E1), when A=Y2−Y1, B=(X2−X1)^(−1) MOD P (or X2−X1) are respectively substituted with SN+A*(−1)^F and TN+B*(−1)^(S, T, F, G, are integers, where F and G are 0 or 1 each), the pattern of overflow is changed (so with the case of (E1)'). H is squared in the process (E2) in MOD P, and this value is the same as the original one, but in the process (E3) since the value is reversed in MOD P, to obtain a right Y3 the result in (E3) has to be corrected. It is clear that when F+G is an even number, correction is not needed and when F+G is an odd number, correction is needed.

An embodiment is shown, but on the summarizing process flow of an elliptic cryptosystem, explanation has been given concerning FIG. 8 and the accompanied description, so that in this place the explanation will be narrowed down to a calculation portion of doubling of S=2S, and S=S+P[J]. In other words, how to implement the algorithm according to the present invention on step 803 (doubling calculation) and steps 809, 810, 811, 812 (summation) will be explained.

Figure 15:
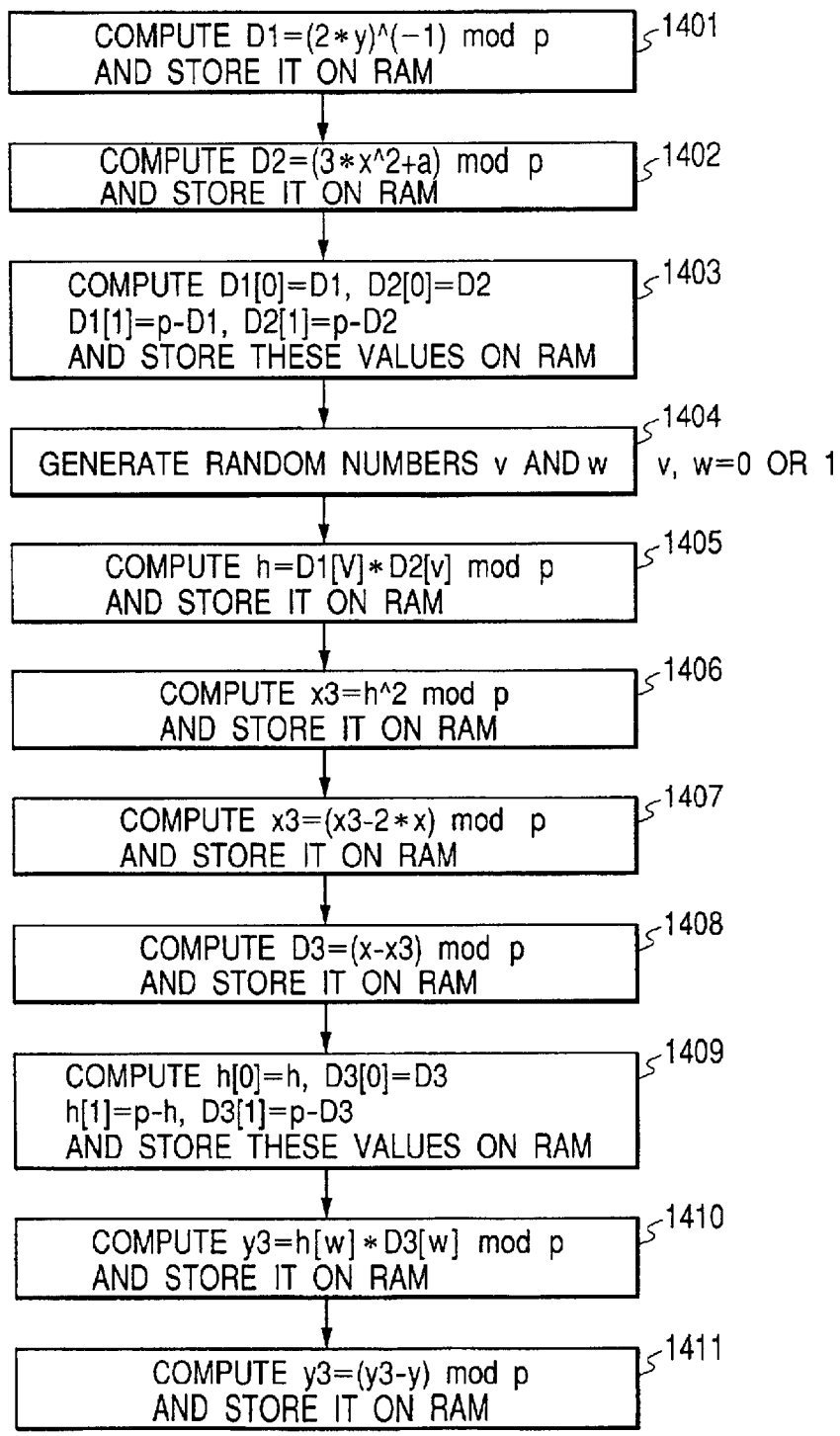
FIG. 15 is a view showing processing procedures of a first embodiment in a case where the present invention is applied to the duplication of a point on an elliptic curve on GF(P)

At first, among the embodiments on the prime field GF(P), the simplest one will be explained. All calculations on a prime field may be executed based on MOD P. FIG. 15 shows a flow chart in which the present invention is applied to the doubling of a point P(X, Y) on the elliptic curve E, Y^2=X^3+AX+B, on the GF(P). In the following, we put 2P=(X3, Y3).

In step 1401, D1=(2*Y)^(−1) MOD P is calculated. Next, in step 1402, D2=(3*X^2+A) MOD P is calculated. For these D1 and D2, a table, D1[0]=D1, D2[0]=D2, D1[1]=P−D1, D2[1]=P−D2 is calculated and the results are stored on a RAM (step 1403). D1[1], D2[1] are inversion values of D1, D2 for MOD P. Next, 2 random numbers (2 bits) V, W (V, W are both 0 or 1) are generated (step 1404). Next, from the table obtained in step 1403, D1[V], D2[V] are taken out and a modular multiplication calculation, H=D1[V]*D2[V] MOD P is executed and the result is stored on a RAM (step 1405). Since D1[1]*D2[1] MOD P=(P−D1)*(P−D2) MOD P=D1*D2 MOD P, at the time when step 1405 is finished, in either case of V=0 or V=1, right H can be obtained. Next, in steps 1406 and 1407, X3 is obtained and the result is stored on a RAM. In step 1408, D3=(X−X3) MOD P is calculated. Next, for the value of D3 and H previously used, a table, H[0]=H, D3[0]=D3, H[1]=P−H, D3[1]=P−D3, is calculated and the result is stored on a RAM (step 1409). H[1], D3[1] are respectively the inversion value of H, D3 for MOD P. Next, H[V], D3[V] are taken out from the table obtained in step 1409, and a modular multiplication calculation, H[W] *D3[W] MOD P, is executed and the result is stored on a RAM (step 1410). Since H[1]*D3[1] MOD P=(P−H)*(P−D3) MOD P=H*D3 MOD P, at the time when step 1410 is finished, even if W=0, or W=1, a right value can be obtained. Finally, in step 1411, Y3=(Y3−Y) MOD P is calculated and the result is stored on a RAM. With the above operation, respective coordinate of 2P is obtained. This is one of embodiments according to the present invention.

In the present embodiment, one of the representative methods for executing reciprocal calculation in step 1401 is the method which utilizes the extended Euclid method and another method is the one which utilizes Fermat's little theorem. The extended Euclid method is a method to obtain D1 on a diophantine equation, 2*Y*D1+P*U=1 as a result of repeating an operation for finding a greatest common measure between 2*Y and P (Eiclid method). On the other hand, a method which utilizes Fermat's little theorem is a method which utilizes the fact that for a positive integer G which is mutually prime with P, an equation, G^(P−1) MOD P=1 is established, whereby the equation, G^(−1) MOD P=G^(P−2) MOD P results. In short, from the equation, D1=(2*Y)^(P−2) MOD P, D1 is obtained. In a method in which Fermat's little theorem is used, the calculation of reciprocals results in a modular exponentiation calculation. Since it is easy to apply the method of the present invention to the modular exponentiation calculation, the leak information form overflow processing can be decreased.

Figure 16:
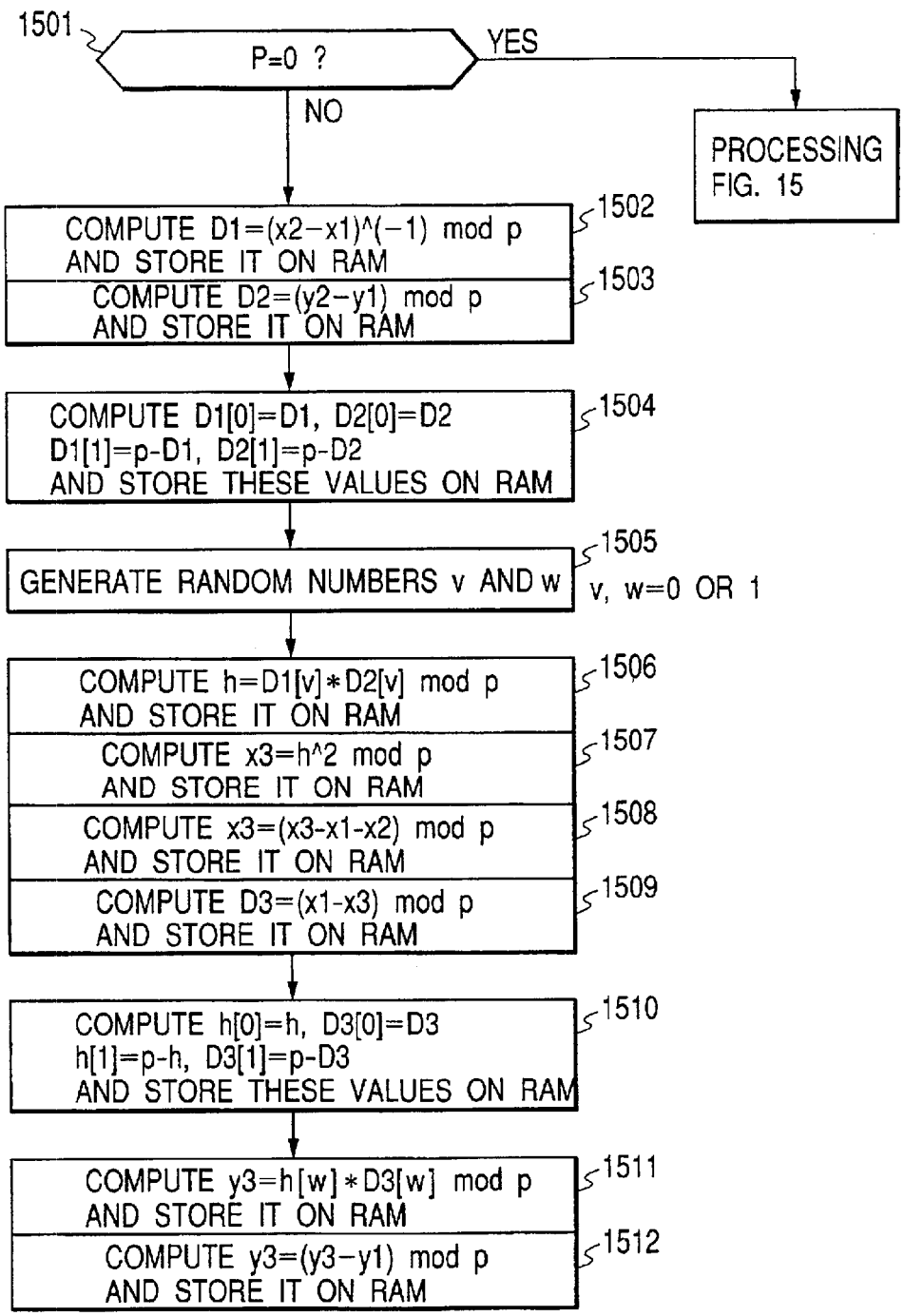
FIG. 16 is a view showing processing procedures of a first embodiment in a case where the present invention is applied to the additional calculation of a point on an elliptic curve on GF (P)

Next, will be described an embodiment in a case where the present invention is applied to the calculation of addition of points for an elliptic curve on the GF(P). In the following, the coordinates of the sum (P+Q) of point P=(X1, Y1) and point Q=(X2, Y2) on an elliptic curve, are assumed to be (X3, Y3) and not to be (P+Q)≡0. FIG. 16 shows the application of the present invention to the calculation of addition of the point P and the point Q on an elliptic curve E, Y^2=X^3+AX+B, on the GF(P).

In the conditional branch process (step 1501), it is judged if the P and Q coincide with each other. If they coincide with each other the calculation becomes doubling, and the process is the same one as explained referring to FIG. 15, so that the explanation will be omitted (provided that the symbols, x, y will be read as x1, y1). In the following the process when P and Q do not coincide will be shown. At step 1502, D1=(X2−X1)^(−1) MOD P is calculated. Next, at step 1503, D2=(Y2−Y1) MOD P. For these D1, D2, a table, D1[0]=D1, D2[0]=D2, D1[1]=P−D1, D2[1]=P−D2 is calculated and the result is stored on a RAM (step 1504). D1[1], D2[1] are respectively the inversion values of D1 and D2 for MOD P. Next, 2 (2 bits) random numbers, V, W are generated (V, W are both 0 or 1) (step 1505). Next, D1[V], D2[V] taken out from the table obtained in step 1504, and a modular multiplication calculation, H=D1[V]*D2[V] MOD P, is executed and the result is stored on a RAM (step 1506). Since D1[1]*D2[1] MOD P=(P−D1)*(P−D2) MOD P=D1*D2 MOD P, when step 1506 is finished, even if V=0 or V=1, a right solution H can be obtained. Next, in steps, 1507, 1509, X3 is obtained and the result is stored on a RAM. In step 1509, D3=(X1−X3) MOD P is calculated. Next, for the D3 and H which is previously obtained, a table, H[0]=H, D3[0]=D3, H[1]=P−H, D3[1]=P−D3, is obtained and the result is stored on a RAM (step 1510). H[1], D3[1] are respectively the inversion values of H, D3 for MOD P. Next, H[W], D3[W] are taken out from the table obtained in step 1510 and a modular multiplication calculation, H[W]*D3 [W] MOD P is executed, and the result is stored on a RAM (step 1511). Since, H[1]*D3[1] MOD P=(P−H)*(P−D3) MOD P=H*D3 MOD P, at the time when step 1511 is finished, even if W is 0 or W is 1, a right solution can be obtained. Finally, at step 1512, Y3=(Y3−Y1) is calculated and the result is stored on a RAM. Thus in the above process, respective coordinate of P+Q is obtained. This is one of embodiments according to the present invention.

An embodiment shown in FIG. 16 can be extended easily to Galois field GF(P^F)(P is a prime, N is a positive integer). As described above, GF(P^N) is homomorphic with a quotient ring, GF(P)[X]/(Φ(X)), produced by prime ideal (Φ(X)) generated by the whole multiple of a irreducible polynomial Φ(X) (reduction polynomial) in GF(P) of a ring GF(P)[X] (polynomial ring) made by the whole polynomial of GF(P) coefficients, and in the computer it is realized as GF(P)[X]/(Φ(X)). When executing the operation, assuming that A(X), B(X) are the elements of GF(P)[X] (a polynomial of GE(P) coefficients), the operation in GF(P)[X]/(Φ(X)) can be realized when we put as shown below, provided that the operation of coefficients is performed in MOD P, (sum): {A(X)+B(X)} MOD Φ(X), (product): A(X)*B(X) MOD Φ(X).

A case example will be shown. A prime is P=5, N=2, and a reduction polynomial Φ(X) is X^2+X+1. Φ(X) is clearly irreducible judging from the fact that $\Phi(0)=1$, $\Phi(1)=3$, $\Phi(2)=7\equiv2(\text{MOD }5)$, $\Phi(3)=13\equiv3(\text{MOD }5)$, and $\Phi(4)=21\equiv1$ (MOD 5). When putting $A(X)=4X^2+3X+2$, $B(X)=3X^2+4X+1$, then sum and product of these 2 polynomials on $GF(5)[X]/(X^2+X+1)$ can be calculated, (sum): $\{A(X)+B(X)\}\text{ MOD }\Phi(X)=7X^2+7X+3=$ $2X^2+2X+3$ (coefficients are calculated with MOD 5)

(product): $A(X)*B(X)\text{ MOD }\Phi(X)=$ $(4X^2+3X+2)*(3X^2+4X+1)\text{ MOD }(X^2+X+1)=$ $12X^4+25X^3+22X^2+11X+2\text{ MOD }(X^2+X+1)=$ $2X^4+2X^2+X+2\text{ MOD }(X^2+X+1)$ (coefficients are calculated with MOD 5) $=X$ Based on this fact, it will be easy to constitute embodiments.

The case where the prime $P\geq3$ will be considered. In this case, all elliptic curves can be transformed to $E: Y^2=X^3+AX+B$. This is called the canonical form of Weierstrass. Since respective components of coordinates of points on E are the elements of $GF(P^N)$, $A(X)$, $B(X)$ can be expressed as the elements of $GF(P)[X]/(\Phi(X))$ as shown in the following $((A(X), B(X))$.

In the following, the embodiment concerning the doubling of $P=(A(X), B(X))$ will be shown. The calculation of sum can be easily estimated from the embodiments shown in FIG. 16 for the case of GF(P) and the embodiment of doubling calculation, so that only the case of the doubling will be explained.

Figure 17:
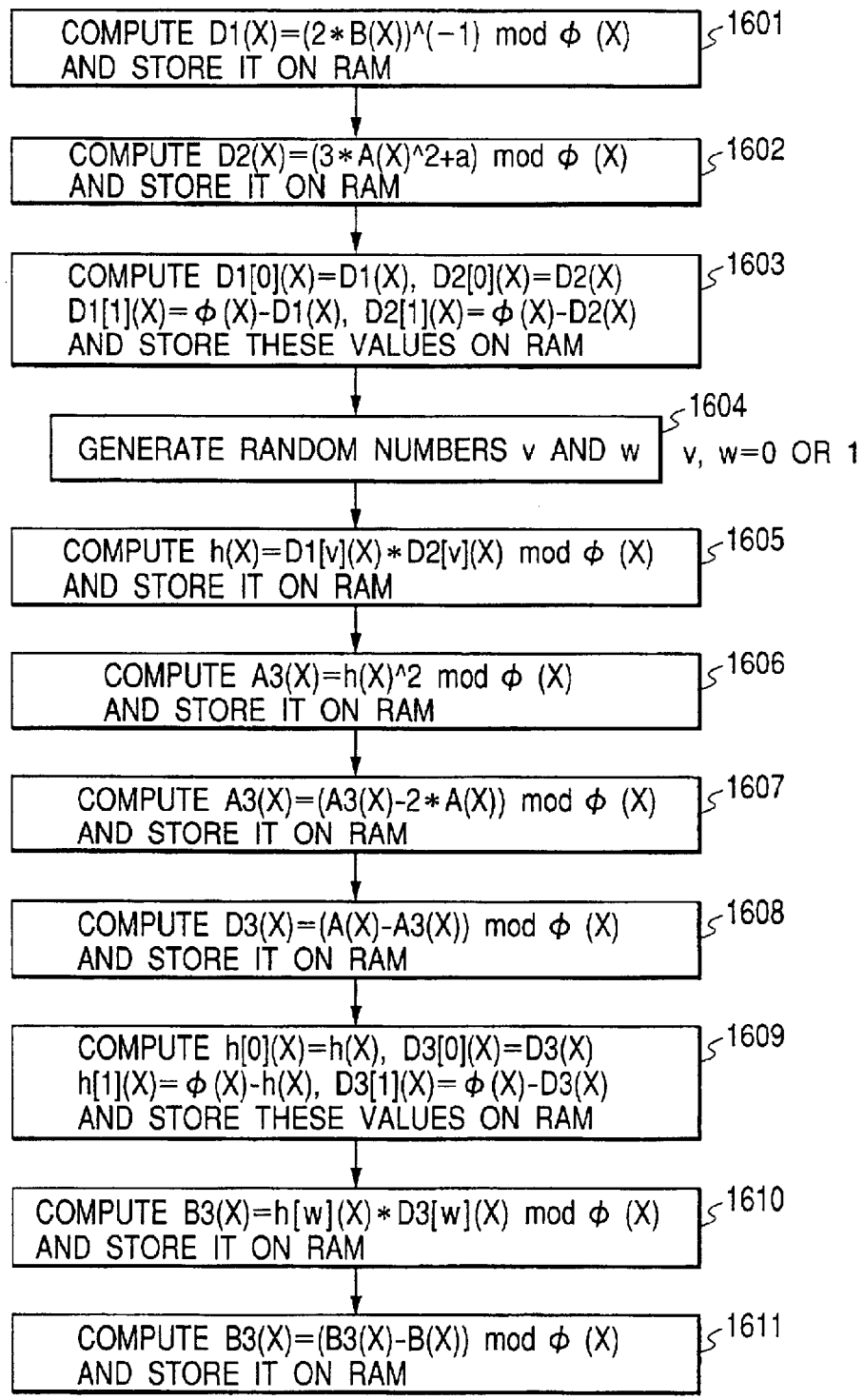
FIG. 17 is a view showing processing procedures of an embodiment in a case where the present invention is applied to the duplication of a point on an elliptic curve on GF(P^N)

In FIG. 17, the embodiment of doubling calculation is shown. In step 1601, $D1(X)=(2*B(X))^{(-1)}\text{ MOD }\Phi(X)$ is calculated. Next, in step 1602, $D2(x)=(3*A(X)^2+A)\text{ MOD }\Phi(X)$ is calculated. Foe these D1, D2, a table, $D1[0](X)=D1(X)$, $D2[0]=D2(X)$, $D1[1](X)=\Phi(X)-D1(X)$, $D2[1](X)=\Phi(X)-D2(X)$, is calculated and the result is stored on a RAM (step 1603). $D1[1](X)$, $D2[1](X)$ are respectively inversion values of D1 (X), D2 (X) for MOD $\Phi(X)$. Next, 2 (2 bits) random numbers, V and W are generated (both V and W are 0 or 1) (step 1604). Next, from the table obtained in step 1603, $D1[V](X)$, $D2[V](X)$ are taken out and a modular multiplication calculation, $H(X)=D1[V](X)*D2[V](X)\text{ MOD }\Phi(X)$ is executed and the result is stored in a RAM (step 1605). Since $D1[1](X)*D2[1](X)\text{ MOD }\Phi(X)=(\Phi(X)-D1(X))*(\Phi(X)-D2(X))\text{ MOD }\Phi(X)=D1(X)*D2(X)\text{ MOD }\Phi(X)$, when step 1605 is finished, even if V=0 or V=1, a right $H(X)$ can be obtained. Next, in steps 1606, 1607, $A3(X)$ is calculated and the result is stored on a RAM. In step 1608, $D3(X)=(A(X)-A3(X))\text{ MOD }\Phi(X)$ is calculated. Next, for the $D3(X)$ and $H(X)$ which is previously used, a table, $H[0](X)=H(X)$, $D3[0](X)=D3(X)$, $H[1](X)=\Phi(X)-H(X)$, $D3[1](X)=\Phi(X)-D3(X)$ is calculated and the result is stored on a RAM (step 1609). $H1(X)$ and $D3[1](X)$ are respectively inversion values of $H(X)$, $D3(X)$ for MOD $\Phi(X)$. Next, $H[W](X)$, $D3[W](X)$ are taken out from the table calculated in step 1609 and a modular multiplication calculation, $H[W](X)*D3[W](X)\text{ MOD }\Phi(X)$ is executed and the result is stored on a RAM (step 1610). Since, $H[1](X)*D3[1](X)\text{ MOD }\Phi(X)=(\Phi(X)-H(X))*(\Phi(X)-D3(X))\text{ MOD }\Phi(X)=H(X)*D3(X)\text{ MOD }\Phi(X)$, at the time when step 1610 is finished, even if W=0 or W=1, a right solution is found. Finally, in step 1611, $B3(X)=(B3(X)-B(X))\text{ MOD }\Phi(X)$ is calculated and the result is stored on a RAM. By the operations hitherto performed the values of respective coordinates of 2P are found. This is one of embodiments according to the present invention.

In the present embodiment, there are 2 representative methods for executing a reciprocal calculation shown in step 1601, one is the method which utilizes extended Euclid method and another one is the method which utilizes Fermat's little theorem. In the extended Euclid method, $D1(X)$ on a diophantine equation, $2*B(X)*D1(X)+\Phi(X)*U(X)=1$, is obtained by repeating an operation for finding a greatest common measure between $2*B(X)$ and $\Phi(X)$ (Euclid method). On the other hand, a method which utilizes Fermat's little theorem is one which utilizes the fact that for $G(X)$ which is mutually prime with $\Phi(X)$, the expression, $G(X)^{(P^N-1)}\text{ MOD }\Phi(X)=1$, is established and therefrom the expression, $G(X)^{(-1)}\text{ MOD }\Phi(X)=G(X)^{(P^N-2)}\text{ MOD }\Phi(X)$ is obtained. In short, $D1(X)$ is obtained from the expression, $D1(X)=(2*B(X))^{(P^N-2)}\text{ MOD }\Phi(X)$. In the calculation of reciprocals, when Fermat's little theorem is used, the calculation results in a modular exponentiation calculation. It is easy to apply the present invention to the modular exponentiation calculation, whereby the leak of information from the overflow processing can be decreased.

Next, an embodiment in the case where P=2 will be explained. In this case, circumstances are a little different from those hitherto. This is caused from the fact that, when the Galois field $GF(2^N)$ is expressed in the form of $GF(2)[X]/(\Phi(X))$ using a reduction polynomial $\Phi(X)$, the coefficients of the polynomial are GF(2). In the case of GF(2), sign is meaningless, since on this field $-1=1$. This makes one of the concepts of the present invention, "inversion on the MOD $\Phi(X)$" meaningless. In the case of the multiplication by an even number of the polynominal $A(X)$ of $GF(2)[X]$, the coefficients are calculated on MOD 2, so that the result becomes 0 and any influence is given to the result of calculation. Thus, $-A(X)=A(X)$. Therefore, the linear combination between $\Phi(X)$ and $A(X)$ on GF(2) becomes, excluding 0, essentially only $\Phi(X)$, $\Phi(X)+A(X)$, and $A(X)$. On the bases of this fact, the embodiment in the case of P=2 will be shown.

In this place an elliptic curve E having Weierstrass canonical form, $Y^2+XY=X^3+AX+B$, will be considered. For the point P $(A(X), B(X))$ on the curve E, we put $2P=(A3(X), B3(X))$. In constituting an embodiment, the formulas of doubling are modified beforehand as shown below, $A3(X)=(H(X)^2+H(X)+A)\text{ MOD }\Phi(X)$ $B3(X)=(H(X)*(A(X)+A3(X))+A3(X)+B(X))\text{ MOD }\Phi(X)$, where it is assumed that $H(X)=(A(X)^2+B(X))*A(X)^{(-1)}\text{ MOD }\Phi(X)$.

Figure 18:
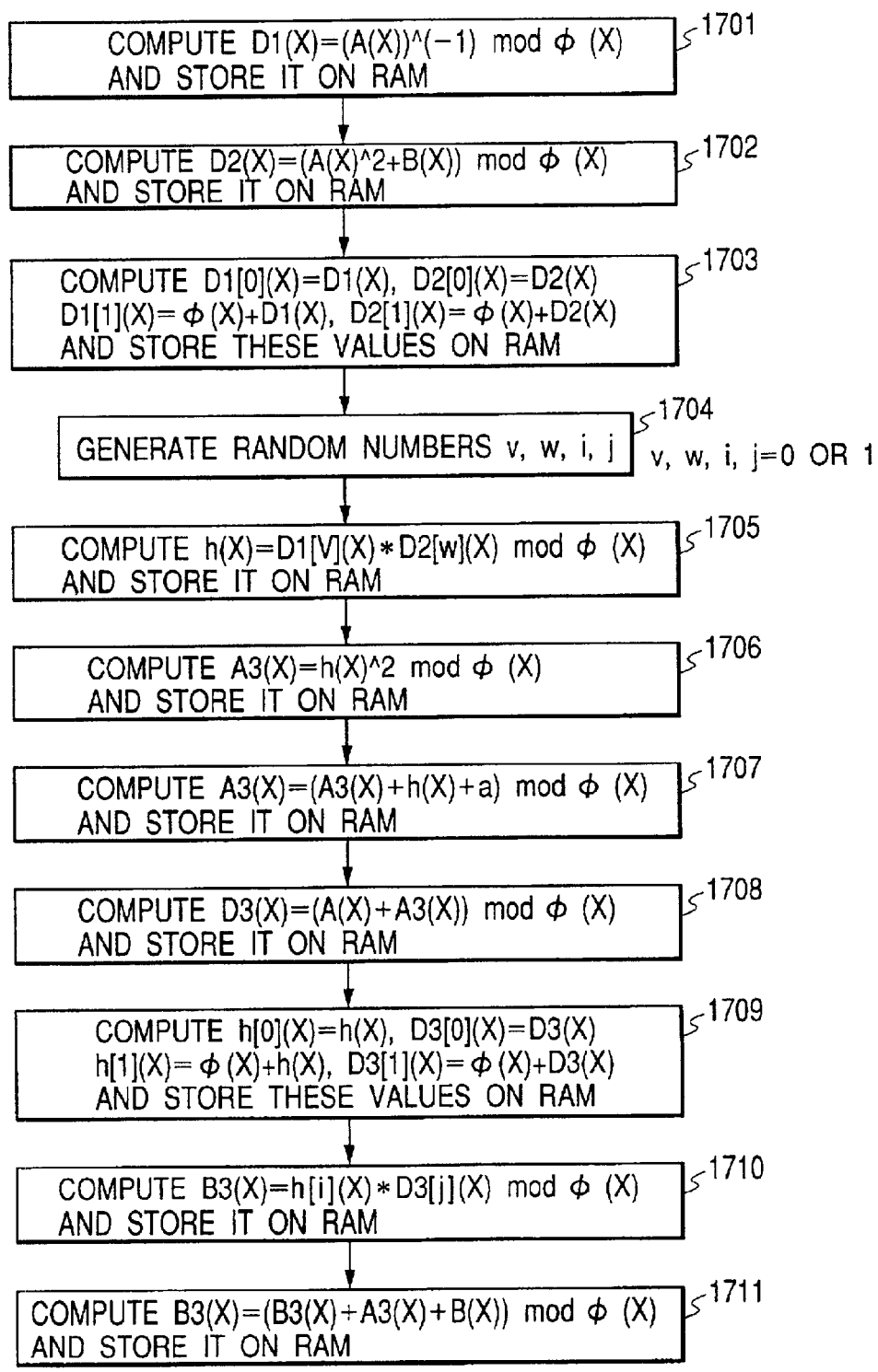
FIG. 18 is a view showing processing procedures of an embodiment in a case where the present invention is applied to the duplication of a point on an elliptic curve on GF(2^N)

FIG. 18 shows an embodiment of doubling calculation. At step 1701, $D1(X)=(A(X))^{(-1)}\text{ MOD }\Phi(X)$ is calculated. Next at step 1702, $D2(X)=(A(X)^2+B(X))\text{ MOD }\Phi(X)$ is calculated. For these $D1(X)$, $D2(X)$, a table, $D1[0](X)=D1(X)$, $D2[0](X)=D2(X)$, $D1[1](X)=\Phi(X)+D1(X)$, $D2[1](X)=\Phi(X)+D2(X)$, is calculated, and the result is stored on a RAM (step 1703) Next, four (four bits) random numbers, V, W, I, J (V, W, I, J, are all 0 or 1) are generated (step 1704). Next, from the table obtained in step 1703, $D1[V](X)$, $D2[W](X)$ are taken out and a modular multiplication calculation, $H(X)=D1[V](X)*D2[W](X)\text{ MOD }\Phi(X)$ is executed and the result is stored in a RAM (step 1705). Since, $(\Phi(X)+D1(X))*D2(X)\text{ MOD }\Phi(X)=D1(X)*(\Phi(X)+D2(X))\text{ MOD }\Phi(X)=(\Phi(X)+D1(X))*(\Phi(X)+D2(X))\text{ MOD }\Phi(X)=D1(X)*D2(X)\text{ MOD }\Phi(X)$, at the time when step

1705 is finished, even if V, W=0 or 1, a right solution H(X) can be found. Next, in steps, 1706, 1707, A3(X) is calculated ant the result is stored in a RAM. In step 1708, D3(X)=(A(X)+A3(X)) MOD Φ(X) is calculated. For the D3(X) and the H(X) which is used previously, a table, H[0](X)=H(X), D3[0](X)=D3(X), H[1](X)=Φ(X)+H(X), D3[1](X)=Φ(X)+D3(X), is obtained and the result is stored on a RAM (step 1709). Next from the table obtained in step 1709, H[I](X) and D3[J](X) are taken out and a modular multiplication calculation, H[I](X)*D3[J](X) MOD Φ(X), is executed and the result is stored on a RAM (step 1710). Since (Φ(X)+H(X))*D3(X) MOD Φ(X)=H(X)*(Φ(X)+D3(X) MOD Φ(X))=(Φ(X)+H (X)*(Φ(X)+D3(X)) MOD Φ(X)=H(X)*D3(X) MOD Φ(X), at the time of finish of step 1710, even if I=0 or 1, or J is 0 or 1, a right solution can be obtained. Finally, in step 1711, B3(X)=(B3(X)+A3(X)+B(X)) MOD Φ(X) is calculated and the result is stored on a RAM. Thus, the respective coordinate values of 2P are obtained. This is one of embodiments according to the present invention.

In the present embodiment, there are 2 representative methods which execute reciprocal calculation in step 1701: one is the method which utilizes extended Euclid method and another one is the method which utilizes Fermat's little theorem. The extended Euclid method is the method to obtain D1(X) on a diophantine equation, A(X)*D1(X)+Φ(X)*U(X)=1, by repeating an operation for finding a greatest common measure between A(X) and Φ(x). On the other hand, another method which utilizes Fermat's little theorem is one which utilizes the fact that for G(X) which is mutually prime with Φ(x), the expression G(X)^(2^N-1) MOD Φ(x)=1 is established, so that the expression, G(X)^(-1) MOD Φ(x)=G(X)^(2^N-2) MOD Φ(x), is established. In short, it is the method to obtain D1(x) from the equation, D1(X)=(A(X))^(2^N-2) MOD Φ(x). With the method which uses Fermat's little theorem to perform reciprocal calculation results in the modular exponentiation calculation. It is easy to apply the method according to the present invention to modular exponentiation calculation, and the leak information from the overflow processing can be decreased.

In the above embodiment concerning the Mordell-Weil group operation of a point on an elliptic curve, the influence of a sign is immediately dissolved. In this place, an embodiment in which the influence of a sign is not dissolved immediately will be shown.

Figure 19:
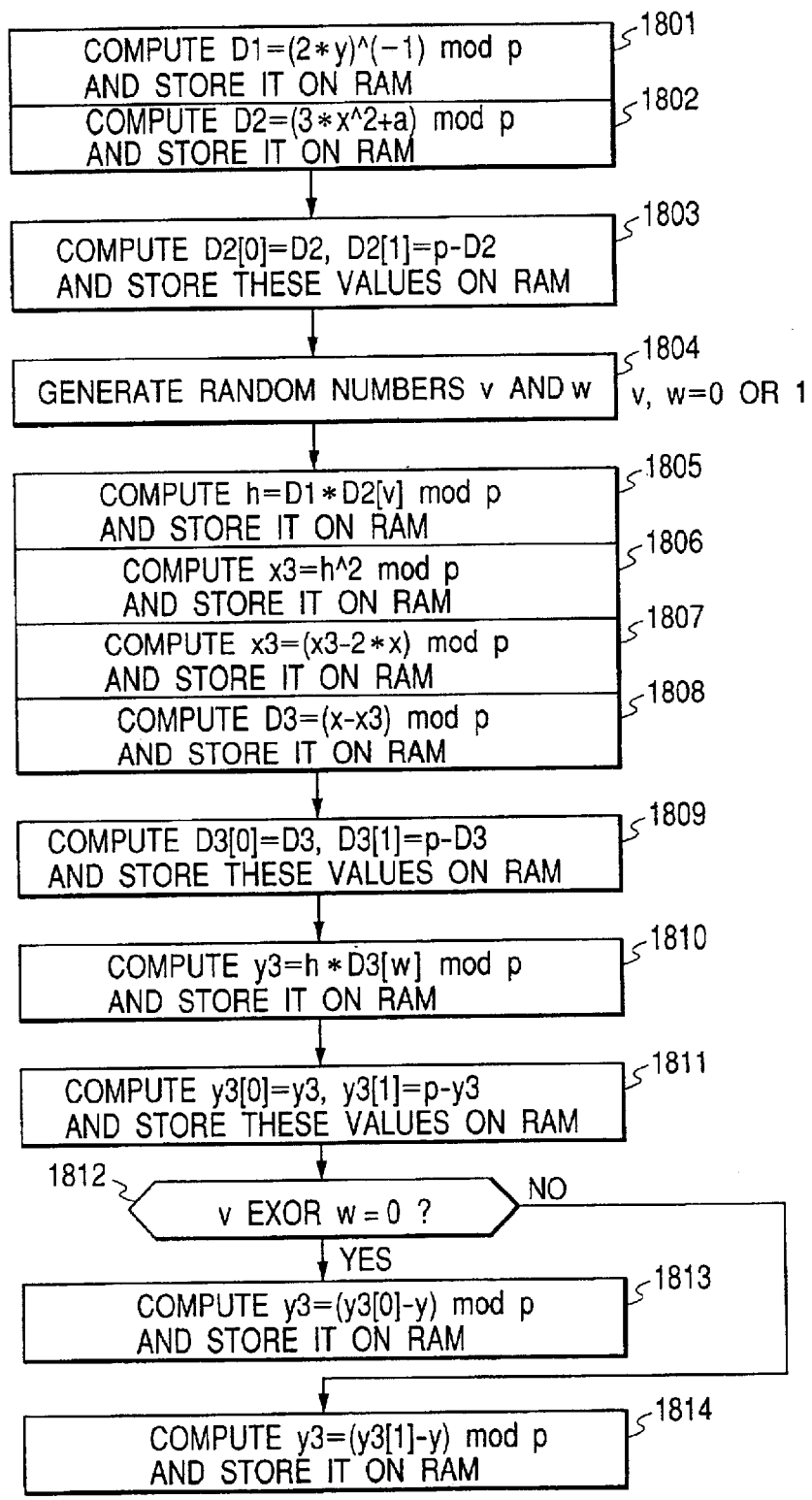
FIG. 19 is a view showing processing procedure of the second embodiment in a case where the present invention is applied to the addition of a point on an elliptic curve on GF(P).

FIG. 19 shows an example in which the present invention is applied to the doubling calculation of a point P=(X, Y) on an elliptic curve E, Y^2=X^3+AX+B, on GF(P). Hereinafter we put 2P=(X3, Y3). In step 1801, D1=(2*Y)^(-1) MOD P is calculated. Next, in step 1802, D2=(3*X^2+A) MOD P is calculated. For D2, a table, D2[0]=D2, D2[1]=P-D2, is calculated, and the result is stored on a RAM (step 1803). D2[1] is the inversion value of D2 for MOD P. Next, 2 (2 bits) random numbers, V, W (both of V and W are 0 or 1) are generated (step 1804). Next, from the table obtained in step 1803, D2[V] is taken out, and a modular multiplication, H=D1*D2[V] MOD P, is executed and the result is stored on a RAM (step 1805). In this place, D1*D2[1] MOD P is equal to D1*D2 MOD P or equal to P-(D1*D2 MOD P), and it is different from the embodiment shown in FIG. 15, at the time when step 1805 is finished, it is not always true that a right solution is obtained. Next, in steps, 1806, 1807, X3 is calculated and the result is stored on a RAM. In step 1806, H is squared on MOD P, so that even if the result of step 1805 is D1*D2 MOD P or P-(D1*D2 MOD P), a right solution X3 is obtained. At step 1808, D3=(X-X3) MOD P is calculated. For the D 3, a table, D3[0]=D3, D3[1]=P-D3, is obtained, and the result is stored on a RAM (step 1809). D3[1] is an inversion value of D3 for MOD P. Next, from the table obtained in step 1809, D3[W] is taken out, and a modular multiplication calculation, H*D3[W] MOD P is executed and the result is stored on a RAM (step 1810). Since, H*D3[1] MOD P=H*(P-D3) MOD P=P-(H*D3 MOD P), at the time when step 1810 is finished, when V=0, the result stored on the RAM becomes H*D3 MOD P, and when V=1, it becomes P-(H*D3 MOD P). In step 1811, a table, Y3[0]=Y3, Y3[1]=P-Y3 is calculated and stored on a RAM. Next, at the conditional branch process (step 1812), it is judged if the value of V EXOR (Exclusive Or) W is 0 or 1. When it is 0, the procedure is advanced to step 1813, and when it is 1, the procedure is advanced to step 1814. When V is identical to W, the value of V EXOR W is 0 and when they are different from each other, it is 1. Therefore, when finally the value of V EXOR W is 0, the right solution Y3 can be obtained in step 1813. When the value of V EXOR W is 1, the right solution Y3 can be obtained in step 1814. With the above processes, the respective coordinate values of 2P are obtained. This is one of embodiments according to the present invention.

In the present embodiment, there are 2 representative methods which execute the reciprocal calculation in step 1801: one is the method which utilizes the extended Euclid method and another one is the method which utilizes Fermat's little theorem. The extended Euclid method is a method to obtain D1 on a diophantine equation, 2*Y*D1+P*U=1 by repeating an operation for finding a greatest common measure between 2*Y and P (Euclid method). On the other hand, the method which utilizes Fermat's little theorem is one which utilizes the fact that for positive integers G which are mutually prime with P, the expression, G^(P-1) MOD P=1 is established, whereby the expression, G^(-1) MOD P=G^(P-2) MOD P, is obtained. In short, D1 is obtained from the expression, D1=(2*Y)^(p-2) MOD P. In the method in which Fermat's little theorem is used, the calculation of reciprocals results in a modular exponentiation calculation. It is easy to apply the method according to the present invention to the modular exponentiation calculation, and the leak information from the overflow processing can be decreased.

It is also easy to extend the present embodiment referring to the embodiment shown in FIG. 16 to the doubling calculation on an elliptic curve on GF(P^N).

After the embodiments according to the present invention, in the information processing device such as an IC card chip, the data which differ from the original ones, i.e., "modular inversion values" are used to calculate the modular multiplication, and after that by the correction of the calculation result, a right solution is obtained. Thus, it becomes difficult to estimate a secret key or internal processing from the waveform of the consumption current.

What is claimed is:

1. A tamper-resistant modular multiplication method for decreasing the relationship between data processing and consumption current therefor in an information-processing device which includes an input/output port communicating with an external device, a memory device for storing both programs and data, a central processing unit executing the data processing in accordance with said programs, and a bus connecting among the input/output port, the memory device and the central processing unit, when calculating a modular multiplication, A*B*R^(-1) mod N, which appears during performing crypto-processing as the data processing, said method comprising the steps of:

(1) selecting either of the following steps (2) and (3) at random;

(2) calculating $S_1 = A*B*R^{\wedge}(-1) \bmod N$ where B is a multiplier, A is a multiplicand, N is a product of large primes, and R is $2^{\wedge}$(a bit length of a bit string of data) according to the Montgomery's method of calculating a modular multiplication for the data;

(3) calculating $S_2 = \{sN+A*(-1)^{\wedge}f\}*\{tN+B*(-1)^{\wedge}g\}R^{\wedge}(-1) \bmod N$, (among arbitrary integers s, t, f, g, at least one is an integer excepting 0, and f, g are both 0 or 1);

(4) repeating the above-mentioned steps (1), (2), (3) for each bit block consisting of the data, wherein finally when the step (2) is selected for a last bit block of the data, for a calculation result $S_1$, $T_1 = S_1*R^{\wedge}(-1) \bmod N$ is calculated to output $T_1$, and when the step (3) is selected, for a calculation result $S_2$, $T_2 = S_2*R^{\wedge}(-1) \bmod N$ is calculated to output $N-T_2$; and (5) using $T_1$ and $N-T_2$ as a calculation result of a modular multiplication, $A*B*R^{\wedge}(-1) \bmod N$.

2. A tamper-resistant modular multiplication method of claim 1, wherein said selecting in the step (1) means to select either one using random numbers.

3. A tamper-resistant modular multiplication method of claim 1, wherein said (s, t, f, g) are (0, 1, 0, 1).

4. A tamper-resistant modular multiplication method of claim 1, wherein said (s, t, f, g) are (1, 0, 1, 0).

5. A tamper-resistant modular multiplication method for decreasing the relationship between data processing and consumption current therefor in an information processing device which includes an input/output port communicating with an external device, a memory device for storing both programs and data, a central processing unit executing the data, processing in accordance with said programs, and a bus connecting among the input/output port, the memory device and the central processing unit, when calculating a modular multiplication, $A*B \bmod p$ (p is a prime), which appears during performing crypto-processing as the data processing, said method comprising the steps of:

(1) selecting either of the following steps (2) and (3) at random;

(2) calculating $S = A*B \bmod p$ where B is a multiplier, A is a multiplicand) for a bit string of data;

(3) calculating $S = \{sp+A*(-1)^{\wedge}F\}*\{tp+B*(-1)^{\wedge}G\} \bmod p$ (among arbitrary integers s, t, f, g, at least one is an integer excepting 0, f and g are both 0 or 1, and f+g is an even number); and (4) using the calculation result S which is selected from said step (2) or (3) as a calculation result of a modular multiplication, $A*B \bmod p$.

6. A tamper-resistant modular multiplication method of claim 5, wherein said (s, t, f, g) are (1, 1, 1, 1).

7. A tamper-resistant modular multiplication method of claim 5, wherein the value of f+g in said step (3) is an odd number, and wherein said method further comprising in place of said step (4):

(4) a step wherein when said step (2)) is selected the calculation result S is adopted as it is, and when said step (3) is selected, p–S is adopted as a calculation result in place of S; and (5) a step for adopting said S and p–S as a calculation result of a modular multiplication operation, $A*B \bmod p$, for crypto-processing.

8. A tamper-resistant modular multiplication method of claim 7, wherein said (s, t, f, g) are (0, 1, 0, 1).

9. A tamper-resistant modular multiplication method for decreasing the relationship between data processing and consumption current therefor in an information processing device which includes an input/output port communicating with an external device, a memory device for storing-both programs and data, a central processing unit executing the data processing in accordance with said programs, and a bus connecting among the input/output port, the memory device and the central processing unit, when calculating a modular multiplication, $A(x)*B(x) \bmod \Phi(x)$, which appears during performing crypto-processing as the data processing, wherein $\Phi(x)$ is an irreducible polynomial of a variable x and the operation of coefficients of $A(x)*B(x)$ is performed for modulus of a prime p which is 3 or more), said method comprising the steps of:

(1) selecting either of the following steps (2) and 3) at random (2) calculating $S(x) = A(x)*B(x) \bmod \Phi(x)$, where $A(x)$ or $B(x)$ is a polynomial of x;

(3) calculating $S(x) = \{s\Phi(x)+A(x)*(-1)^{\wedge}f\}*\{t\Phi(x)+B(x)*(-1)^{\wedge}g\} \bmod \Phi(x)$ (among arbitrary integers s, t, f, g, at least one is an integer excepting 0, f and g are both 0 or 1, and f+g is an even number); and (4) using the calculation result $S(x)$ which is selected from said step (2) and (3) as a calculation result of a modular multiplication, $A(x)*B(x) \bmod \Phi(x)$, for cryptoprocessing.

10. A tamper-resistant modular multiplication method of claim 9, wherein said (s, t, f, g) are (1, 1, 1, 1).

11. A tamper-resistant modular multiplication method of claim 9, wherein the value of f+g in the step (3) is an odd number, and wherein said method further comprises in place of said step (4):

(4) a step wherein when the step (2) is selected the calculation result $S(x)$ is adopted as it is, and when said step (3) is selected, $\Phi(x)-S(x)$ is adopted as a result of calculation result in place of $S(x)$; and (5) a step for adopting said $S(x)$ and $\Phi(x)-S(x)$ as a calculation result of a modular multiplication operation, $A(x)*B(x) \bmod \Phi(x)$, for crypto-processing.

12. A tamper-resistant modulus multiplication method of claim 11, wherein said (s, t, f, g) are (0, 1, 0, 1).

13. A tamper-resistant modular multiplication method claim 9, wherein said operation of the coefficients of $A(x)*B(x)$ is performed for modulus of a prime 2 and (f, g) in said step (3) are (0, 0).

* * * * *